(12) United States Patent
Armstrong et al.

(10) Patent No.: US 10,931,994 B2
(45) Date of Patent: Feb. 23, 2021

(54) SYSTEMS, METHODS, AND APPARATUSES FOR IMPLEMENTING A DIRECT-TO-AIR MANAGEMENT AND AUDIT PLATFORM FOR DYNAMIC ADVERTISING CONTENT

(71) Applicant: Synchronicity.co, Inc., Wilsonville, OR (US)

(72) Inventors: John Robert Armstrong, Oxnard, CA (US); Reese Armstrong, Playa Vista, CA (US); Rondee Quinton Businger, Central Point, OR (US)

(73) Assignee: Synchronicity Finance LLC, Wilsonville, OR (US)

( * ) Notice: Subject to any disclaimer, the term of this patent is extended or adjusted under 35 U.S.C. 154(b) by 0 days.

(21) Appl. No.: 16/377,094

(22) Filed: Apr. 5, 2019

(65) Prior Publication Data

US 2019/0313141 A1    Oct. 10, 2019

Related U.S. Application Data

(60) Provisional application No. 62/654,074, filed on Apr. 6, 2018.

(51) Int. Cl.
| | | |
|---|---|---|
| *H04N 21/262* | (2011.01) | |
| *G06Q 30/02* | (2012.01) | |
| *H04N 21/458* | (2011.01) | |
| *G10L 15/26* | (2006.01) | |

(52) U.S. Cl.
CPC ... *H04N 21/26241* (2013.01); *G06Q 30/0252* (2013.01); *G06Q 30/0276* (2013.01); *G10L 15/26* (2013.01); *H04N 21/458* (2013.01)

(58) Field of Classification Search
None
See application file for complete search history.

(56) References Cited

U.S. PATENT DOCUMENTS

| | | | |
|---|---|---|---|
| 9,699,502 B1 * | 7/2017 | Sandholm | H04N 21/442 |
| 2014/0282709 A1 * | 9/2014 | Hardy | H04N 21/6181 |
| | | | 725/34 |
| 2017/0116648 A1 * | 4/2017 | Vallaeys | G06Q 30/0277 |

* cited by examiner

*Primary Examiner* — Omar S Parra
(74) *Attorney, Agent, or Firm* — Elliott, Ostrander & Preston, P.C.

(57) ABSTRACT

In accordance with embodiments disclosed herein, there are provided methods and systems for implementing a direct-to-air management and audit platform for dynamic advertising content. For example, in accordance with one embodiment, there is a system to implement direct-to-air management and audit platform for dynamic advertising content, wherein the system comprises: an interface to one or more advertisers; an interface to one or more traffic manager systems; an interface to one or more broadcast stations; and auditing means for tracking and reporting compliance of advertising content by the one or more broadcast stations pursuant to specifications for the performance of the advertising content as established by the one or more traffic managers. Other related embodiments are disclosed.

20 Claims, 17 Drawing Sheets

202 ⟶  (Continued from Fig 2A)  FIG. 2B

(A)

```
Synchronicity platform generates customized automation logs for each station
and directly injects advertising spots and logs into the automation systems of
the respective content airing stations.                                    230
```

```
Automation systems of the respective content airing stations (e.g., radio and TV
stations) play the daily programming and spots to air in accordance with the
scheduling specified by the Synchronicity platform using the injected advertising
spots and logs.                                                            235
```

```
Optionally, the Synchronicity platform will send targeted interactive creative to
mobile apps for concurrent display with the terrestrial signal for each content
airing station.                                                            240
```

```
Synchronicity platform iteratively retrieves event logs (e.g., daily, nightly, etc.)
from all the automation systems of all the connected content airing stations
having their schedules managed by the Synchronicity platform.              245
```

```
Synchronicity platform processes the event logs retrieved and the processed
and reconciled data is then displayed to each content airing group's Traffic
Management Dashboard, with affidavits being automatically generated and
delivered to Radio Networks and Ad Agencies as required providing
confirmation of advertising content being broadcast correctly.             250
```

( End )

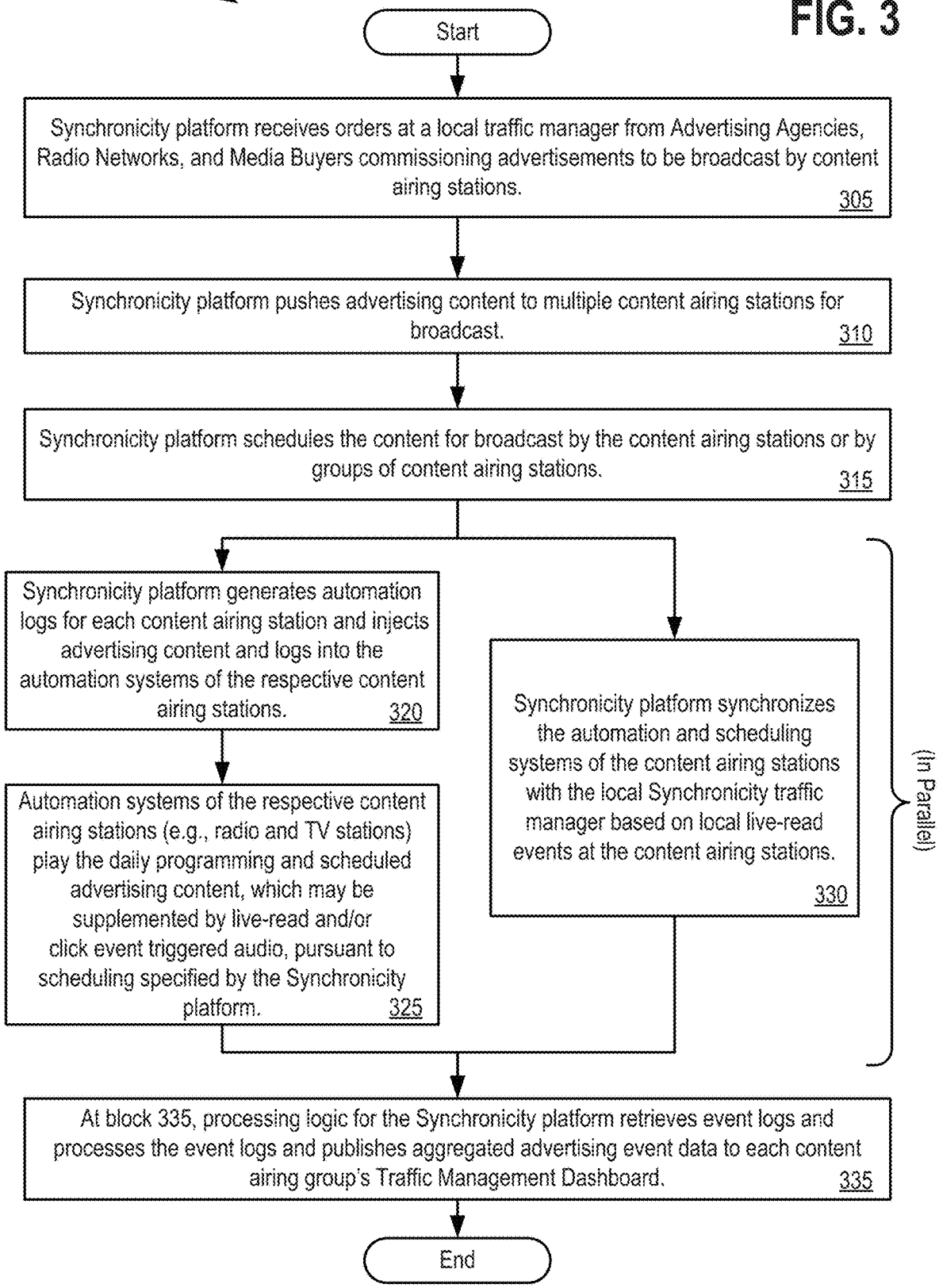

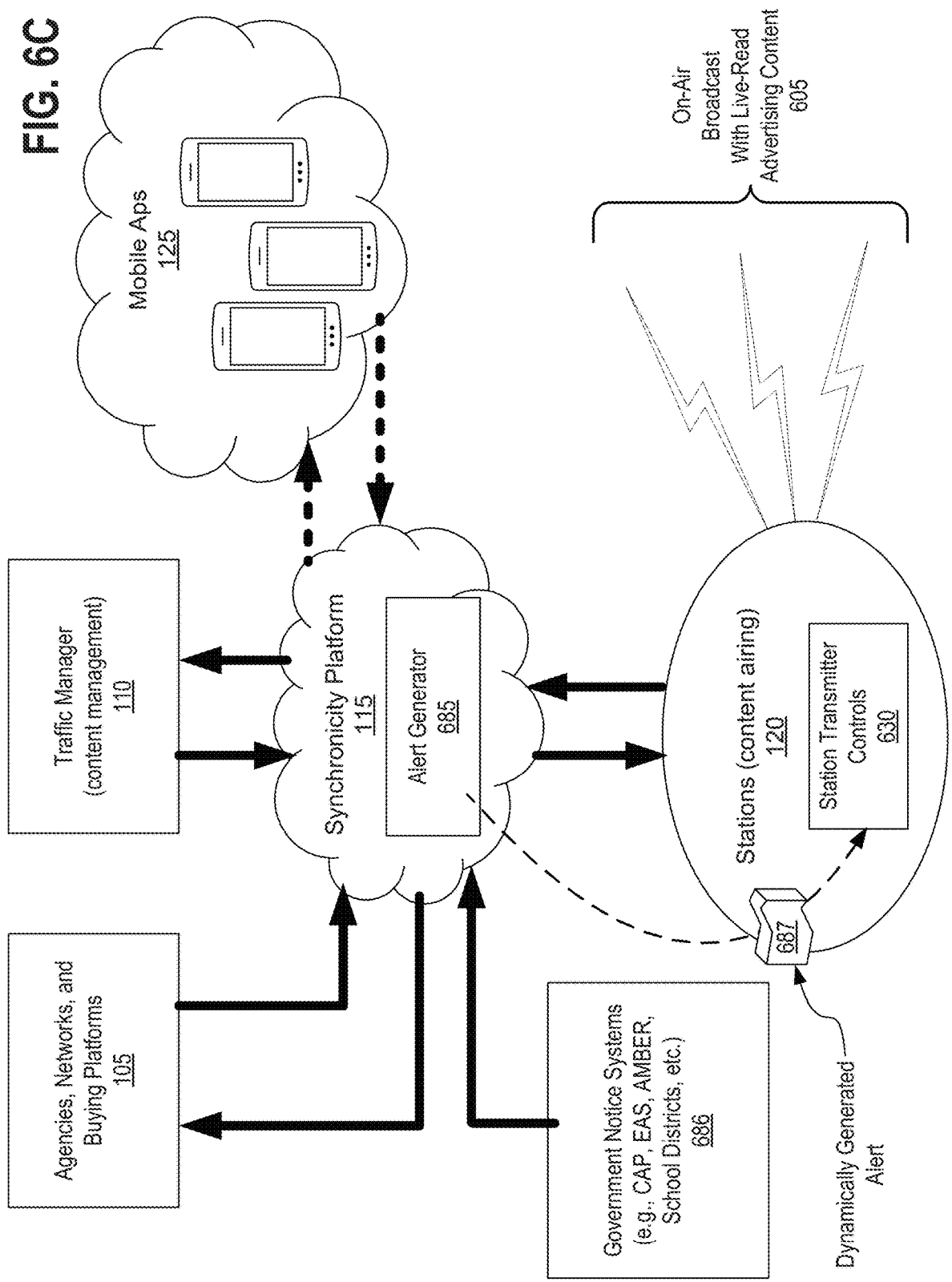

FIG. 7

Performed
MM/DD/YYYY HH:MM:SS AM – Beau Talent

Closed
Beau Talent: MM/DD/YYYY HH:MM:SS AM
Lisa Host: MM/DD/YYYY HH:MM:SS AM
Lisa Host: MM/DD/YYYY HH:MM:SS PM
Lisa Host: MM/DD/YYYY HH:MM:SS PM
Lisa Host: MM/DD/YYYY HH:MM:SS PM
Lisa Host: MM/DD/YYYY HH:MM:SS PM
Lisa Host: MM/DD/YYYY HH:MM:SS PM
Kevin Manager: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS AM
Kevin Manager: MM/DD/YYYY HH:MM:SS PM
John Admin: MM/DD/YYYY HH:MM:SS PM
Kevin Manager: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM
Lisa Host: MM/DD/YYYY HH:MM:SS AM Opened
Beau Talent: MM/DD/YYYY HH:MM:SS AM
Lisa Host: MM/DD/YYYY HH:MM:SS AM
Lisa Host: MM/DD/YYYY HH:MM:SS PM
Lisa Host: MM/DD/YYYY HH:MM:SS PM
Lisa Host: MM/DD/YYYY HH:MM:SS PM
Kevin Manager: MM/DD/YYYY HH:MM:SS AM

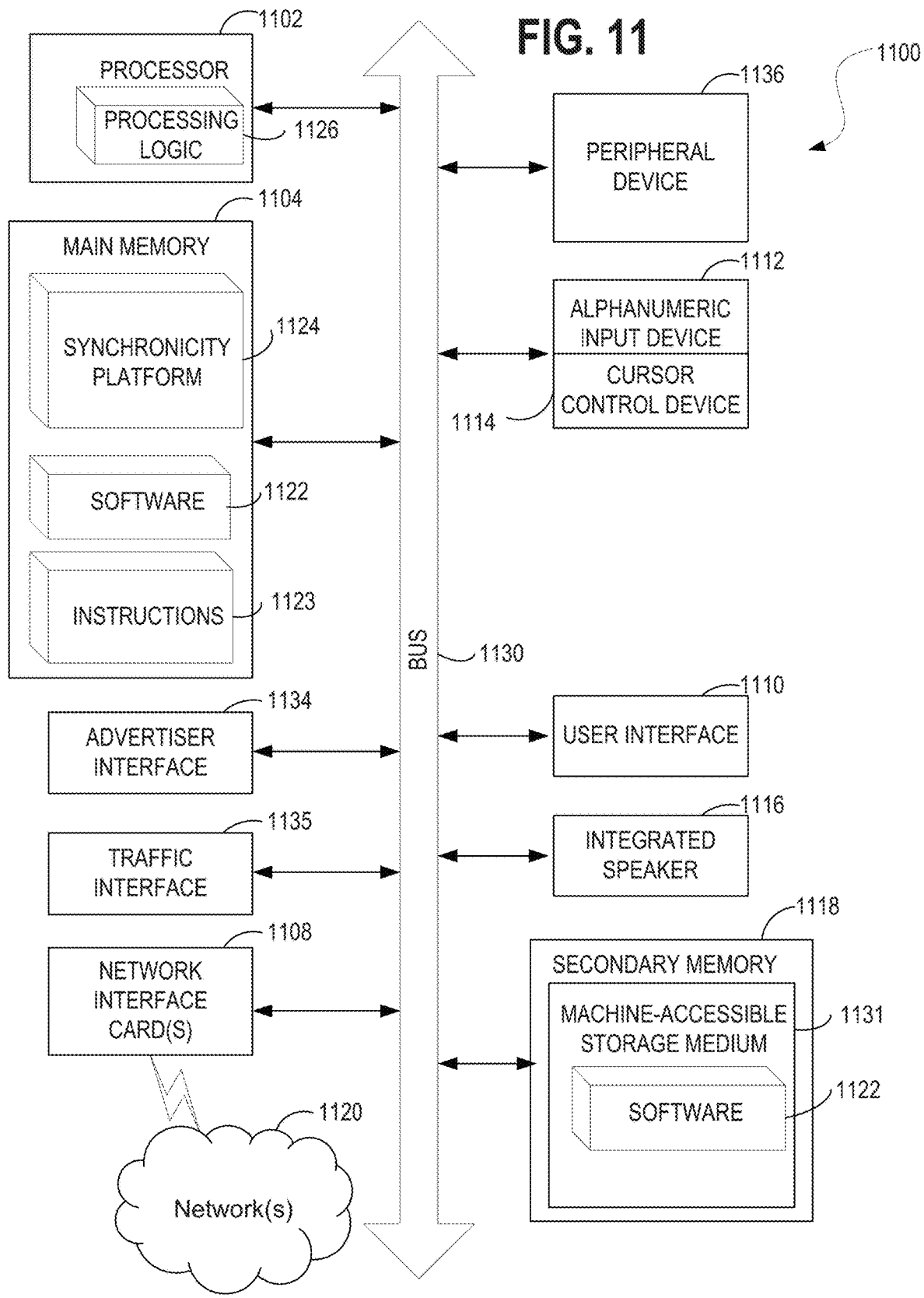

SYSTEMS, METHODS, AND APPARATUSES FOR IMPLEMENTING A DIRECT-TO-AIR MANAGEMENT AND AUDIT PLATFORM FOR DYNAMIC ADVERTISING CONTENT

CLAIM OF PRIORITY

This U.S. Utility Patent Application is related to, and claims priority to, the U.S. Provisional Application No. 62/654,074 filed Apr. 6, 2018 entitled "SYSTEMS, METHODS, AND APPARATUSES FOR IMPLEMENTING A DIRECT-TO-AIR MANAGEMENT AND AUDIT PLATFORM FOR DYNAMIC ADVERTISING CONTENT," the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of content distribution platforms, and more particularly, to systems, methods, and apparatuses for implementing a direct-to-air management and audit platform for dynamic advertising content.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Advertising is well known amongst all types of media distribution platforms, including newsprint, television, radio, social media, etc. Each media distribution platform enjoys its own particular benefits and also suffers from a variety of disadvantages.

Certain media distribution platforms such as radio and television may provide a mix of pre-recorded content which is then supplemented by various "spots" or short advertising content segments which are interspersed within the primary programming. For example, a television show may be broken up into multiple segments during its allocated 30 minute slot, with multiple advertising "spots" played in between the multiple segments of the primary programming. Similarly, radio play may consist of commentary, music, or other programming, with short advertising radio spots interspersed between the primary programming.

In certain instances, the primary programming is live while the advertising spots are pre-recorded. Alternatively, both may be pre-recorded, both may be live, or the advertising spots may be live and interspersed within pre-recorded programming content.

Regardless, it is commonplace to play advertising spots during television and radio programming as doing so provides an important source of revenue for the broadcast station. Unfortunately, tracking, management, monitoring of such advertising content or "spots" has been unduly cumbersome due to the manually intensive methods, with automation in the field being non-existent. Moreover, current methodologies permit only static advertising content to be distributed for direct-to-air broadcast, with no ability whatsoever to support dynamic content.

The present state of the art may therefore benefit from systems, methods, and apparatuses for implementing a direct-to-air management and audit platform for dynamic advertising content as is described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 2A and 2B depict a flow diagram illustrating a method for implementing a direct-to-air management and audit platform for dynamic advertising content, in accordance with described embodiments;

FIG. 3 depicts an alternative methodology for implementing a direct-to-air management and audit platform for dynamic advertising content, in accordance with described embodiments;

FIG. 6C depicts an alert generator at the Synchronicity platform which is utilized to dynamically create alerts for radio and television broadcast, in accordance with described embodiments;

FIG. 7 depicts an exemplary sponsor script access log, including a time stamp for the script, in accordance with described embodiments;

FIG. 11 illustrates a diagrammatic representation of a machine in the exemplary form of a computer system, in accordance with one embodiment.

DETAILED DESCRIPTION

Figure 1A:
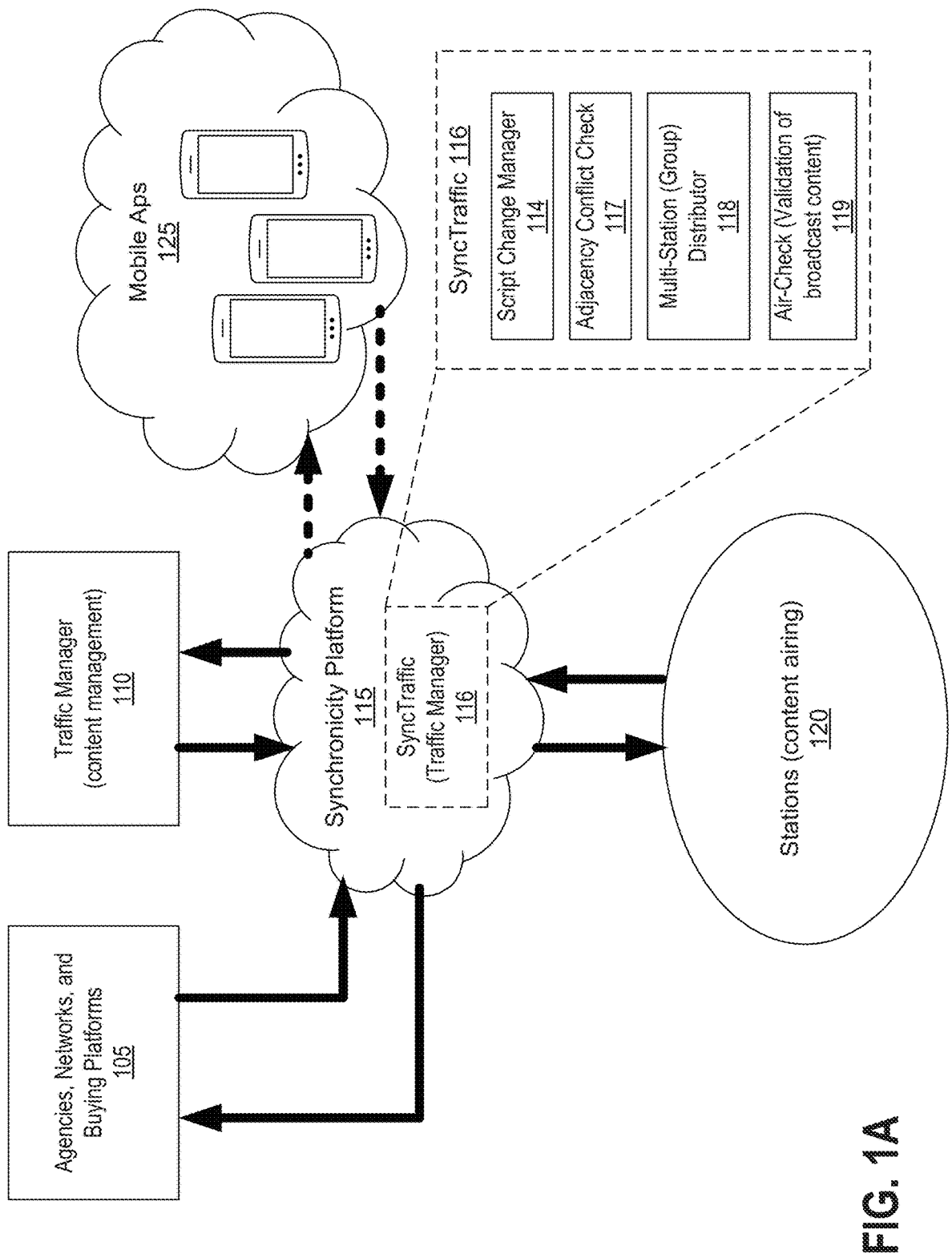
FIG. 1A illustrates a system architecture of the Synchronicity Platform which implements a direct-to-air management and audit platform for dynamic advertising content in accordance with described embodiments.

Described herein are methods and systems for implementing a direct-to-air management and audit platform for dynamic advertising content as is described herein. For instance, according to one embodiment, there is a system to implement direct-to-air management and audit platform for dynamic advertising content, wherein the system comprises: an interface to one or more advertisers; an interface to one or more traffic manager systems; an interface to one or more broadcast stations; and auditing means for tracking and reporting compliance of advertising content by the one or more broadcast stations pursuant to specifications for the performance of the advertising content as established by the one or more traffic managers.

Synchronicity provides the world's first all-inclusive programming, advertising, production, and media distribution system utilizing a distributed computing platform explicitly designed for the broadcast industry. Synchronicity brings together talent, program producers, syndicators, advertising agencies, and broadcast operations onto one common platform to speed up and simplify media production, distribution, and playout. Synchronicity's advanced technology platform improves quality, expedites work flow, dramatically lowers infrastructure costs, and provides new pathways to increase revenue.

In the following description, numerous specific details are set forth such as examples of specific systems, languages, components, etc., in order to provide a thorough understanding of the various embodiments. It will be apparent, however, to one skilled in the art that these specific details need not be employed to practice the disclosed embodiments. In other instances, well-known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software, including software instructions that perform the operations described herein via memory and one or more processors of a computing platform.

Embodiments also relate to a system or apparatus for performing the operations herein. The disclosed system or apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, flash, NAND, solid state drives (SSDs), CD-ROMs, and magnetic-optical disks, read-only memories (ROMs), random access memories (RAMs), EPROMs, EEPROMs, magnetic or optical cards, or any type of media suitable for storing non-transitory electronic instructions, each coupled to a computer system bus. In one embodiment, a non-transitory computer readable storage medium having instructions stored thereon, causes one or more processors within a Management Device, a traffic aggregation unit, and/or a traffic de-aggregator to perform the methods and operations which are described herein. In another embodiment, the instructions to perform such methods and operations are stored upon a non-transitory computer readable medium for later execution.

The algorithms and displays presented herein are not inherently related to any particular computer or other apparatus nor are embodiments described with reference to any particular programming language. It will be appreciated that a variety of programming languages may be used to implement the teachings of the embodiments as described herein.

FIG. 1A illustrates a system architecture of the Synchronicity Platform 115 which implements a direct-to-air management and audit platform for dynamic advertising content in accordance with described embodiments.

In particular, there is depicted at block 105 a variety of agencies, networks, and buying platforms which seek to have advertising content broadcast via the stations 120 which provide content airing (e.g., radio broadcast, television broadcasts, etc., as depicted here at element 120. The Synchronicity platform 115 provides a centralized intermediary between the agencies, networks, and buying platforms at block 105, and the traffic manager depicted at block 110 provides content management. The Synchronicity platform 115 further provides an intermediary for any mobile apps 125 interacting with the primary programming content or the advertising content specified by the traffic manager 110 and the content airing stations 120 themselves. While the content airing stations 120 and the content traffic manager 110 are depicted here as an example, there are a wide variety of content airing stations 120 which broadcast such advertising content and there are a similarly large variety of content traffic managers which allocate time and place advertising spots into programming to be broadcast via the available stations interfaced with the Synchronicity platform 115.

Prior solutions are wholly lacking in any automated method to create and present sponsor scripts for their news anchors and DJ's to read live on air. Moreover, it may be necessary to provide a Sarbanes-Oxley Act (SOX) compliant audit trail for verification of such reads or presentation of the sponsored advertising content read by the news anchors and DJ's from the sponsor's scripts. Prior solutions typically required news stations and radio stations to print paper copies of sponsor scripts and then have the talent read those paper copies of the sponsor script and notate the time on the paper copy itself, subsequent to which other staff would key the relevant information into their traffic and billing software on a daily basis. Unfortunately, the volume of those scripts, reach approximately 11,000 sponsor scripts per week across more than a hundred radio stations for just a single broadcast entity, requiring substantial manpower to key in the data at significant cost. Such manual procedures utilized via conventional solutions are prone to error, induce billing discrepancies, and are unacceptably slow for any traffic manager 110 or content airing station 120 operating at any significant scale, very often requiring multiple weeks of delay from the time a sponsor's script is read, and thus the services rendered, to receipt of payment from the advertiser, due to the manually intensive and error-prone nature of conventional processes.

Consequently, the previously used "print and read" solution has become unacceptable to many broadcast and content airing stations 120 due to the inability to scale such a solution to volume.

The Synchronicity platform 115 is therefore configured in accordance with certain embodiments to manage multiple forms of media, such as audio, video and text, and provide automated integration of sponsor's scripts with such media content.

For instance, the Synchronicity platform 115 implements a customized system capable of interfacing with traffic manager platforms provided by various content airing stations and broadcasters, such as Entercom, Cox, etc., which is configured to receive traffic schedules from both the legacy local traffic systems as well as receive traffic schedules from the newer Wide Orbit or Marketron systems as well as insertion orders from proprietary or AAAA.org broadcast schemas compatible systems, and then combine those content insertions into a single presentation for on-air talent (e.g., anchors, radio hosts, and TV and radio personalities) to read live, on-air, and secondarily for the pre-recording of scripts by those TV and radio hosts, on-air talent, and personalities, to be played back on-air at a later time. The embodiments disclosed herein are further capable of accepting a confirmation by the on-air talent to document and record the post-log times, which are then automatically injected into the advertiser reconciliation website/server.

The Synchronicity platform 115 additionally transfers and updates appropriate live-read scripts or recorded audio to all broadcast station radio affiliate locations (e.g., such as all CBS radio and/or television broadcast stations).

In such a way, the Synchronicity platform 115 provides seamless data connectivity with both the broadcaster and advertiser systems whereas no such solution existed before.

In accordance with certain embodiments, the Synchronicity direct-to-air platform includes its own traffic manager 116 local to, and embedded within the synchronicity platform itself, which is referred to herein as the "SyncTraffic" application that, in cooperation with connected broadcast stations existing traffic scheduling applications or traffic managers, is further capable to organize spot traffic workflow for individual stations or entire station groups which do not implement their own traffic managers 110 for content management, thus permitting customers to entirely outsource the traffic management obligations where desired.

SyncTraffic 116 therefore replaces multiple stand-alone software applications from different vendors with one consolidated platform to manage tasks from order entry processing, copy creation and production, to agency creative acquisition, preparation and playout and finally to air-play reporting. SyncTraffic 116 automates processes including collecting, QC'ing commercials creative to ensure that every spot is air ready, and then storing all local and national commercials from all sources in one central file location, and tasks like carting up and loading the current barter inventory along with all long and short form syndicated network programming and then interfacing with playout automation systems.

The SyncTraffic 116 platform gives station group traffic supervisors minute-by-minute control over every insertion order at every station in the whole group. SyncTraffic makes "just in time advertising" practical and reliable so advertisers can immediately respond to strategic opportunities or make last-minute "emergency copy" and production changes. Spots air precisely when and where they need to, so advertisers can respond to the marketplace faster and maximize the effectiveness of their advertising investment. Synchronicity is rolling out SyncTraffic for terrestrial Radio first and will add synchronous digital playout later in the year.

SyncTraffic 116 traffic manager therefore eliminates repetitive manual tasks, saving group-wide traffic and production staff hundreds of man-hours per week. SyncTraffic traffic manager further eliminates reliance on stand-alone applications that must be operated and managed at each individual station. SyncTraffic 116 traffic manager simplifies production and acquisition of all spot creative and eliminates scheduling and preparation and insertion into automation of barter inventory. SyncTraffic traffic manager additionally checks for adjacency conflicts and other problems before air time while remaining flexible to permit station managers to make last minute changes on one or all stations up to three minutes before air, with such edits and other features being available to managers from any web-enabled PC, tablet or phone as depicted by element 125.

For instance, there is specifically depicted within the expanded SynTraffic 116 element multiple functional components of the platform implemented local traffic manager, including, for example, a script change manager 114, an adjacency conflict check 117 component, a multi-station (group) distributor 118 for pushing content for broadcast to multiple stations for airing based on a common group affiliation, and an air-check 119 to provide for validation of broadcast content, such as verification that a name or advertiser's brand was pronounced correctly, etc.

SyncTraffic 116 therefore provides for a single curated point of ingress (e.g., one centralized point for incoming advertising content including sponsor scripts) for all national, regional and local spot creative. Continuity is simplified through the use of master pools of national and local spots which are up-to-the minute current, QC'd, and approved for air, while providing local production with group oversight, such that all local spots and local production creative are accessible for review and approval at a group level any time.

SyncTraffic 116 additionally provides group-wide system transparency with a single point of oversight with real-time reporting of traffic activity before, during, and after airplay, including airplay reconciliation for the whole group available the next morning. Affidavit preparation is scheduled and automatic and provides a "one click" approval process, thus eliminating the printed paper copies of sponsor scripts and the manual annotations which must then be inserted into a different system.

According to certain embodiments, the Synchronicity platform or the SyncTraffic 116 sub-system directly connects all affiliated agencies and networks such that all barter spots are retrieved the moment they are available. Once advertising spots are performed, various automated quality control steps applied to the performed spots. According to certain embodiments, available, but not yet scheduled, advertising spots are moved into master spot pools until they are scheduled to be loaded into the automation system. For instance, network barter affidavits may be automatically created and reported directly to the networks on a weekly basis. Syndicated and long form programs and in-show spots are automatically retrieved from the networks, analyzed for quality control, carted inventory and tracking and retrieval, and then loaded into automation. Network syndicated programs and long form affidavits may be automatically created and reported directly to the networks.

According to other embodiments, the Synchronicity platform or the SyncTraffic 116 sub-system automatically performs media descriptive analysis to compare the newly produced and finalized program log to the media in the automation system so as to ensure the accuracy of spot lengths, Ad-ID or ISCI ("Industry Standard Commercial Identifier") codes and advertiser names and will report any mismatches for correction. All commercials received from all spot delivery sources may be automatically processed for quality control (audio quality, normalization, spot length, slate removal, file format changes, inserting metadata, etc.). Spots passing quality control (QC) processes are then placed into a master spot pool until they are scheduled to be loaded into the automation system. Spots with any unresolved discrepancies are reported for correction as they enter the SyncTraffic 116 sub-system and well before airtime. Group and station management have 24/7 web browser access to all the processes the SyncTraffic 116 sub-system and can set up personalized text or email alerts to notify them when problems are detected. All the processes that the SyncTraffic 116 sub-system performs for the terrestrial signals are also available for digital stream creation and reporting at a later time.

In such a way, the Synchronicity platform 115 provides an all-inclusive programming and advertising production and distribution cloud service platform explicitly designed for the broadcast industry. The collaborative workspace technology brings talent, program producers, syndicators, advertising agencies, and broadcasters all together into one common fast and secure platform to speed up and simplify every aspect of media production, distribution, playout and reporting, thus expediting workflows, eliminating redundant tasks, and dramatically lowering costs.

Clients utilizing the Synchronicity platform benefit from the direct-to-air platform for distribution of every type of programming, from top-of-the hour news to 24-hour formats. In addition to the terrestrial station play-out, the Synchronicity platform also provides RSS feeds of audio and short-form video to websites and services like iTunes, iHeart, and TuneIn, and host 24-hour programs streaming directly to consumers. A Sync playout (hardware) network enables live programming to be simulcast with digital zip+4 targeted, direct-to-consumer services. The entire Synchronicity network and affiliate system installations are monitored 24/7 by support engineers to ensure all systems are operating as expected.

Figure 1B:
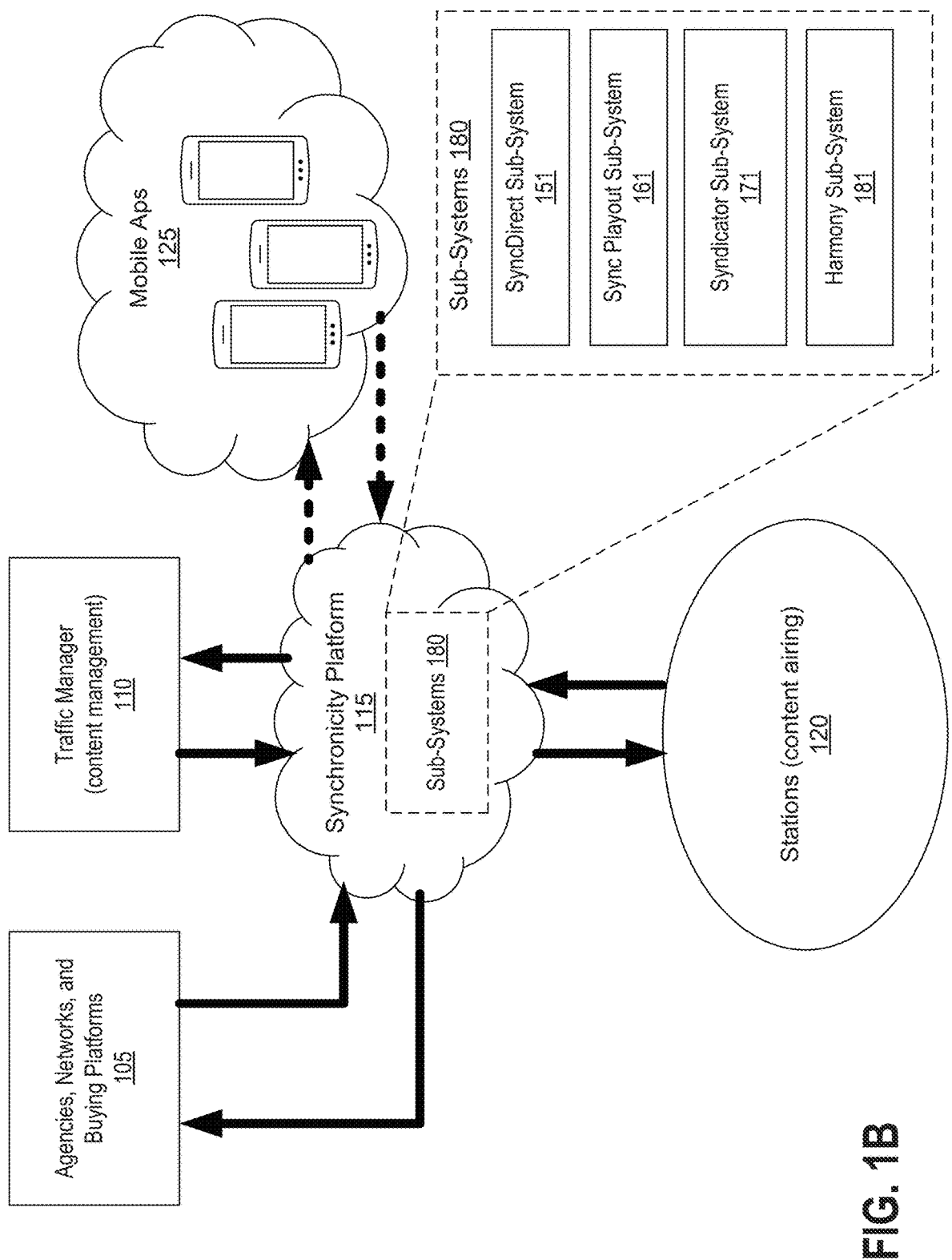
FIG. 1B illustrates a system architecture of the Synchronicity Platform additional sub-systems shown in greater detail, in accordance with described embodiments.

FIG. 1B illustrates a system architecture of the Synchronicity Platform 115 additional sub-systems shown in greater detail, in accordance with described embodiments.

For instance, there is depicted here, multiple Synchronicity platform 115 sub-systems 180, including the SyncDirect sub-system 151, the Sync Playout Sub-Systems 161, the Syndicator Sub-System 171, and the Harmony Sub-System 181.

Direct-to-Air Spot Distribution Functionality:

According to other embodiments, the Synchronicity platform 115 implements a SyncDirect sub-system 151 which provides a comprehensive, fully automated, real-time distribution solution for all pre-recorded spots and live-read scripts. SyncDirect gives agencies' creative and traffic departments precise, event-by-event control over every insertion in every station on a buy. Moreover, the SyncDirect sub-system 151 permits advertising agencies to respond to the marketplace faster through "just in time advertising" capabilities which are both practical and reliable, as the just in time advertising features enable clients to immediately respond to strategic opportunities, make last-minute emergency copy changes, or make mid-flight adjustments to maximize the effectiveness of their advertising investments.

Because the Synchronicity platform 115 is accessible any time from anywhere, spots and insertion orders are automatically uploaded, processed, and confirmed in seconds, so copy changes can be playing on any station in fewer than 10 minutes. With the SyncDirect sub-system 151, spots sound better. Original production *.wav files (e.g., audio recording files) are converted to SyncHD audio format for distribution to provide the highest audio quality possible, thus eliminating low quality MP3 formation audio. The SyncDirect sub-system 151 provides a reliable, end-to-end, completely-automated workflow makes station-by-station customized programming sharing and group-wide traffic management simple and fast with 24/7 Support. The SyncDirect sub-system 151 support engineers provide monitoring of all systems 24/7 so that clients may focus on their core business objectives rather than system operation, ensuring that programming airs on time every time.

Direct-to-Air with No Hardware:

According to certain embodiments, the SyncDirect sub-system 151 is locally installed at a client's location, remote from the Synchronicity platform 115, yet functionally remains interfaced and integrated with the Synchronicity platform. Once installed, SyncApp converts original audio to studio-quality SyncHD, and then instantly uploads files to Synchronicity directly from the production studio or remote voice talent. Insertion orders are processed as they are received from ad agencies. Music and traffic log changes are auto-merged in the Synchronicity platform 115, and then injected directly into station automation. Program elements are pulled down individually to each affiliate, and are custom formatted and directly injected into the automation system with real-time confirmation of air play and corresponding affidavits being available shortly thereafter, either the following morning or minutes after broadcast, depending on the particular implementation and needs of the client.

Live with No Satellites:

Still further, according to other embodiments, the Synchronicity platform 115 implements a Sync Playout sub-system 161. The Sync Playout sub-system's 161 multi-channel playout Harmony Receivers (SyncRCVR) are deployed in radio stations where there is a requirement for live program transmission. The Harmony Receivers create a live program distribution network with capabilities that far exceed the most sophisticated satellite networks. Simultaneous live studio quality (20-20 Khz) stereo feeds are provided, with all IP-based, 24/7-managed network "platform as a service" and support dashboards continuously displaying operational status of every receiver. The Harmony Receivers integrate with existing automation systems and provide "always on," non-linear program management such that any content can be routed and played out at any affiliate instantaneously. Clients may utilize the Sync Playout sub-system 161 to create or tear down special purpose ad-hoc networks in minutes and even pause and buffer live programming to provide "breaking news" then seamlessly resume the live programming stream or the live programming content after the pause.

Direct to Air Production Workflow:

According to other embodiments, the Synchronicity platform 115 implements a Syndicator sub-system 171. The Syndicator sub-system 171 provides direct-to-air capabilities so as to enable practical and reliable just-in-time programming. Music, spots and voice tracks are maintained separately and are not pre-combined, thus permitting clients to be more spontaneous and creative and make last minute emergency changes, even while a show is playing out. Short form content to 24-hour format content is supported, with all programming airing on every affiliate precisely how the client specifies, including support for dynamic content which utilizes a base template sponsor script with client-specified modifications on a per-station basis. For instance, to read out the local weather, a local location, a local sales price for a product, a current time for a local station, etc., with such dynamic content being seamlessly integrated into a script to be read by on-air talent in a seamless fashion. Split copy spot insertions in-show or ROS are also automated.

For advertising agencies, automated, real-time workflows gives creatives and traffic departments comprehensive, minute-by-minute control over every insertion in every station on a buy. Spots and insertion orders are automatically uploaded, processed, and confirmed in seconds, and can be playing on any station in fewer than 10 minutes. SOX-compliant affidavits are available overnight. Live Reads are included in the real-time workflow. Easy to create Local or imported national scripts are in front of talent in minutes, regardless of whether they are static or dynamic scripts. Therefore, when a sponsor's script is read on air (or when it isn't read on-air due to programming issues), the advertising agency is provided with instant SOX compliant reporting for auditing, billing, and programming purposes.

For broadcasting stations, real-time direct-to-air production workflows gives station operators a single, unified method to control all production and playout processes, which eliminates manual, error-prone, repetitive, and time-wasting tasks. The Synchronicity platform 115 automates the entire process, and brings all the local and national programming and spots together for real-time playout.

Harmony Functionality:

According to other embodiments, the Synchronicity platform implements a Harmony sub-system 181. The Harmony sub-system 181 provides a leading-edge hardware+distributed computing platform that manages all aspects of a radio station's programming playout. Harmony's distributed infrastructure and custom hardware bring unparalleled power and flexibility to radio stations.

Harmony's breakthrough technology is completely integrated with Synchronicity's Sync Playout 161 media management platform sub-system, which is designed to simplify a radio station's audio playout, while delivering a new level of HD sound quality. The result is a single source solution for radio stations that not only provides centralized command and control, but also utilizes connected devices for instantaneous delivery that populates throughout the system and generates real-time reports.

The Harmony sub-system 181 is integrated with the Synchronicity platform 115 for instant updating of all media with a real time live-log that seamlessly rebuilds in seconds.

Additional functionality includes voice tracking from anywhere anytime, sync-network distributed remote management access (not merely web pages or TeamViewer), synchronized continuous full system backups on the Synchronicity platform 115 servers, the ability to seamlessly switch into any live stereo network feeds (e.g., talk or sports—with no satellite receiver required).

Figure 2A:
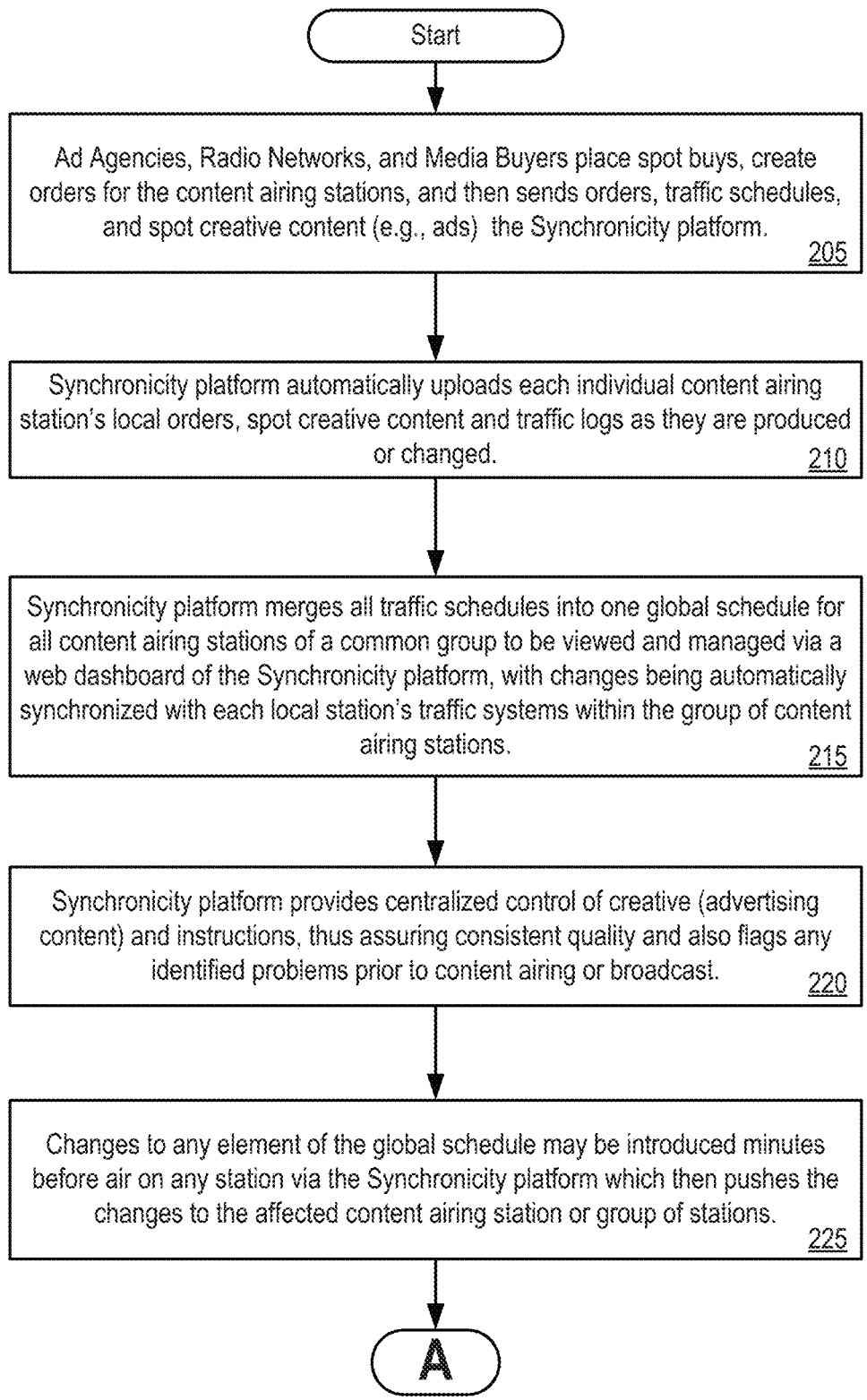

FIGS. 2A and 2B depict a flow diagram illustrating a method 201-202 for implementing a direct-to-air management and audit platform for dynamic advertising content, in accordance with described embodiments. The method begins at FIG. 2A and is linked with FIG. 2B via the connector "A" depicted in the respective figures.

Method 201-202 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 201-202 is performed or coordinated via system architecture such as that depicted at FIG. 1, such as the Synchronicity platform. Some of the blocks and/or operations listed below are optional in accordance with certain embodiments. The numbering of the blocks presented is for the sake of clarity and is not intended to prescribe an order of operations in which the various blocks must occur. Additionally, operations from method flows 201-202 may be utilized in a variety of combinations.

Method 201-202 begins at block 205 where Advertising Agencies, Radio Networks, and Media Buyers place spot buys, create orders for the content airing stations, and then sends orders, traffic schedules, and spot creative content (e.g., ads) the Synchronicity platform.

At block 210, processing logic for the Synchronicity platform automatically uploads each individual content airing station's local orders, spot creative content and traffic logs as they are produced or changed. According to certain embodiments, once event logs are processed and the reconciled, data representing the advertising spot performance is displayed on a group traffic management dashboard representing a group of content airing stations or on a traffic management dashboard for a specific content airing station. Further still, affidavits attesting to the timely play of the content or reading of the sponsor script are generated and delivered to the radio networks and advertising agencies as required for the purposes of auditing and billing.

At block 215, processing logic for the Synchronicity platform merges all traffic schedules into one global schedule for all content airing stations of a common group to be viewed and managed via a web dashboard of the Synchronicity platform, with changes being automatically synchronized with each local station's traffic systems within the group of content airing stations.

At block 220, processing logic for the Synchronicity platform provides centralized control of creative (advertising content) and instructions, thus assuring consistent quality and also flags any identified problems prior to content airing or broadcast.

At block 225, processing logic for the Synchronicity platform facilitates, identifies, and schedules changes to any element of the global schedule, which may be introduced minutes before air on any station via the Synchronicity platform. Processing logic for the Synchronicity platform then pushes the changes to the affected content airing station or group of stations. Sometimes such changes are referred to as "emergency" ad changes or "emergency" scheduling changes. Regardless, processing logic for the Synchronicity platform permits such changes up to a pre-defined deadline or scheduling cut-off, which may be minutes prior to air time, depending on the implementation and agreements in place with the particular content airing stations or the group of airing stations which are commonly affiliated with a larger entity (e.g., entities such as CBS, NBC, Cox, etc., have multiple such content airing stations under their authority, all of which may be managed by the Synchronicity platform in an aggregated manner).

Processing for method 201-202 continues at FIG. 2B, which is connected with the method operations of FIG. 2A via connector "A."

Following connector "A" and continuing with the operations of method 201-202, processing logic for the Synchronicity platform at block 230, generates customized automation logs for each station and directly injects advertising spots and logs into the automation systems of the respective content airing stations. Such logs aid in the tracking of events, such as the airing and performance of the requested advertising content spots injected into the automation systems for the respective stations.

At block 235, processing logic of the automation systems of the respective content airing stations (e.g., radio and TV stations) play the daily programming and spots to air in accordance with the scheduling specified by the Synchronicity platform using the injected advertising spots and logs.

At block 240, processing logic for the Synchronicity platform optionally may send targeted interactive creative (e.g., multi-media and digital media advertising content) to mobile apps connected via the synchronicity platform, for concurrent display with the terrestrial signal broadcast from each content airing station. In such a way, connected mobile devices may receive digital content concurrent with advertising content being aired from a particular radio station or television station.

At block 245, processing logic for the Synchronicity platform iteratively retrieves event logs (e.g., daily, nightly, etc.) from all the automation systems of all the connected content airing stations having their schedules managed by the Synchronicity platform.

At block 250, processing logic for the Synchronicity platform processes the event logs retrieved and the processed and reconciled data is then displayed to each content airing group's Traffic Management Dashboard, with affidavits being automatically generated and delivered to Radio Networks and Ad Agencies as required providing confirmation of advertising content being broadcast correctly.

FIG. 3 depicts an alternative methodology 301 for implementing a direct-to-air management and audit platform for dynamic advertising content, including a mechanism by which to synchronize click events and local advertising events between the Synchronicity platform and the local content airing stations, in accordance with described embodiments.

As before, method 301 may be performed by processing logic that may include hardware (e.g., circuitry, dedicated logic, programmable logic, microcode, etc.), software (e.g., instructions run on a processing device to perform various operations such as interfacing functions, collecting, monitoring, diagnosing and reporting information, and executing/initiating instructions, or some combination thereof). In one embodiment, method 301 is performed or coordinated via system architecture such as that depicted at FIG. 1, such as the Synchronicity platform. Some of the blocks and/or operations listed below are optional in accordance with certain embodiments. The numbering of the blocks presented is for the sake of clarity and is not intended to prescribe an order of operations in which the various blocks must occur. Additionally, operations from method flows 301 may be utilized in a variety of combinations.

Method 301 begins at block 305 where processing logic for the Synchronicity platform receives orders at a local traffic manager from Advertising Agencies, Radio Networks, and Media Buyers commissioning advertisements to be broadcast by content airing stations.

At block 310, processing logic for the Synchronicity platform pushes advertising content to multiple content airing stations for broadcast.

At block 315, processing logic for the Synchronicity platform schedules the content for broadcast by the content airing stations or by groups of content airing stations.

At block 320, processing logic for the Synchronicity platform generates automation logs for each content airing station and injects advertising content and logs into the automation systems of the respective content airing stations.

At block 325, processing logic of the automation systems of the respective content airing stations (e.g., radio and TV stations) play the daily programming and scheduled advertising content, which may be supplemented by live-read and/or click event triggered audio, pursuant to scheduling specified by the Synchronicity platform.

At block 330, in parallel with the processing of block 320 and 325, processing logic for the Synchronicity platform synchronizes the automation and scheduling systems of the content airing stations with the local Synchronicity traffic manager based on local live-read events at the content airing stations. For example, on-air talent at the content airing stations may trigger actions, such as by clicking a "play" button during a broadcast to play pre-recorded audio, voice, script, jingles, or sound-effects through the soundboard of the content airing station (e.g., causing such audio to be played out over the air from a radio station or from a TV station) as part of the scheduled advertisement. These events are both recorded locally at the scheduling and automation system of each respective content airing station, but are additionally synchronized with the traffic manager at the Synchronicity platform, thus permitting for the display of the click events via an aggregated dashboard provided by the Synchronicity platform.

Therefore, the Synchronicity platform operates to control both the automation system of the local content airing station which schedules the scripts for on-air reads, but also operates to control, in parallel, the an automated scheduling system provided by the Synchronicity platform which permits for the playing of audio content (e.g., sonic branding audio content) live on air before, after, during, or concurrent with the live on-air reading of the script.

For example, the Synchronicity platform may communicate with two automation systems concurrently, by communicating with both a Synchronicity platform ad server as well as the content airing station's own existing automation systems, so as to coordinate the activity between the station which may be playing the spots that the Synchronicity platform trafficked to them through the direct to air process. Additionally, the on-air talent may read a script displayed on the web-page on air and the on-air talent may additionally click on a button which plays sonic branding audio live on-air. In such a way, the Synchronicity platform coordinates, from within a single application, the scheduling of the ad content as well as the advertising events as they occur based on the scheduling and automation system of the station (e.g., the clicking of sonic branding events to play audio and the clickable events indicating the display of a script as part of advertising content or the marking as read for such a script).

Through such coordinated communication with both systems, the Synchronicity platform then merges and reconciles the captured data (e.g., scheduling and event occurrences) and displays such data to the traffic dashboard accessible to the client along with other ads by that client or other ads played by that station, for the purpose of accounting and auditability. For example, the traffic dashboard information provided to advertising agencies, clients, and advertisers will display in a single location, both the time a script was marked as read live on-air as well as the confirmation that a sonic branding audio file was played (e.g., by clicking the play button) and thus broadcast.

At block 335, processing logic for the Synchronicity platform retrieves event logs and processes the event logs and publishes aggregated advertising event data to each content airing group's Traffic Management Dashboard.

Figure 4A:
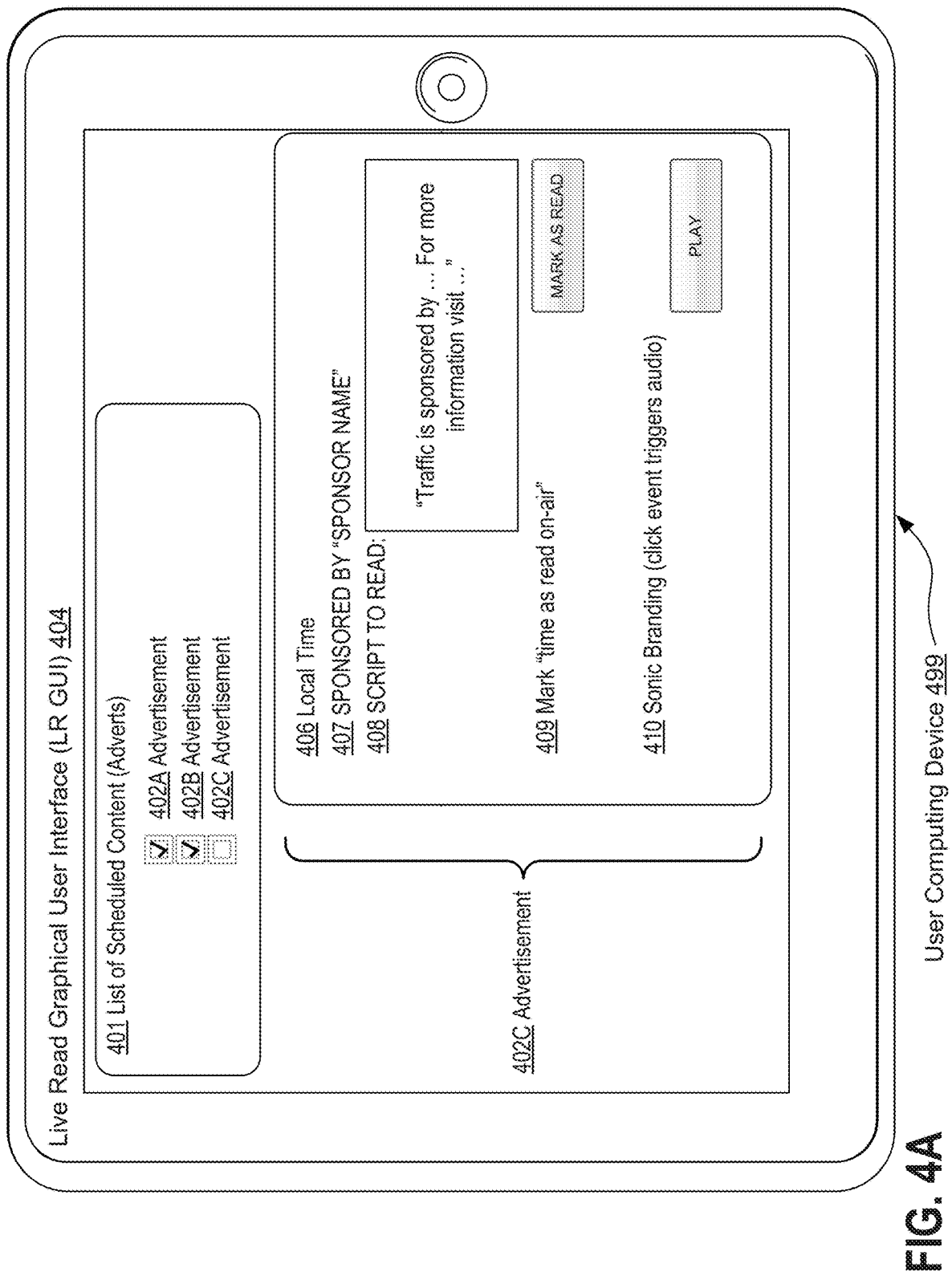
FIG. 4A depicts a Live Read Graphical User Interface (LR GUI) displayed to a user computing device, in accordance with described embodiments.

FIG. 4A depicts a Live Read Graphical User Interface (LR GUI) 404 displayed to a user computing device 499, in accordance with described embodiments.

Specifically depicted is a list of scheduled content (e.g., advertisements) at element 401, which includes three scheduled advertisements, 402A, 402B, and 402C. As can be seen here, advertisements or scheduled content 402A and 402B are marked as having been completed whereas advertisement 402C remains un-checked.

Below there is a particular advertisement 402C which is displayed to the LR GUI 404 in greater detail. Notably, there is depicted the local time 406, a sponsored by tag at element 407 (e.g., sponsored by Avocados from Mexico or sponsored by Dodge Ram, etc.), and a script to read at element 408, having displayed therein the actual language to be read on-air by the on-air talent, anchor, host, or other radio or TV personality. Further provided are two clickable events, a first being the "time as read" clickable event at element 409 which permits the host, disk jockey, or other on-air talent to click a button within the LR GUI 404 to mark the script as having been read once the script has been read on-air to confirm that indeed the advertisement occurred as commissioned. For instance, recording within the system the read-time (as per when the mark as read button or the "time as read" button 409 is clicked) as well as saving the script read, the local time, and other relevant metadata.

Another clickable event depicted here is the sonic branding "play" clickable event as depicted at element 410 which permits the on-air talent to click a button to play a jingle, or play pre-recorded audio, or play sound effects through the soundboard for broadcast via the live on-air signal, or to play any pre-recorded audio which is associated with the advertisement 402C, as per the content creation representative and traffic manager.

According to certain embodiments, the play button clickable event as depicted at element 410 triggers an IP burst audio for broadcast, which may be played before, during, or after the advertising script to be read 408. In certain embodiments, multiple play clickable events 410 may be utilized when specified by the advertisement creative director and creator whereas in other situations, such as a news story broadcast, there may be no pre-recorded audio to be played. In certain situations, a script may be read live and on-air by the on-air talent, followed by the IP burst audio triggered by the play clickable event 410 to play over the air, the advertiser's jingle.

Certain variations of the above described methods are contemplated in accordance with the described embodiments. For example:

In accordance with a particular embodiment, there is a method performed by a system having at least a processor and a memory therein to execute instructions, in which the method includes: managing advertising content at the system on behalf of a plurality of customers; transmitting a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; receiving an indication at the system from one of the remote content airing stations that the advertising content is to be broadcast; capturing a broadcast of the advertising content for analysis at the system; and validating the broadcast of the advertising content.

In accordance with another embodiment, such a method further includes: displaying the advertising content in a script format to a GUI of a user computing device at the content airing station to broadcast the advertising content; displaying a first clickable button at the GUI of the user computing device to mark the advertising content as having been read live on-air as part of the broadcast; and displaying a second clickable button at the GUI of the user computing device to trigger playback of sonic branding audio through a soundboard of the content airing station to broadcast the advertising content.

In accordance with another embodiment, such a method further includes: receiving a first click event of the first clickable button indicating the advertising content has been marked as read live on-air as part of the broadcast and recording a time of broadcast of the advertising content for audit and validation of the broadcast; and receiving a second click event of the second clickable button indicating the playback of the sonic branding audio has been initiated, in which the second click event triggers an IP burst of the sonic branding audio to the soundboard of the content airing station which broadcasts the sonic branding audio live on-air as part of the broadcast of the advertising content.

In accordance with another embodiment of the described methods, the one or more dynamic content fields to be resolved prior to broadcast of the advertising content includes one or more of: a current time dynamic content field to be resolved into the current time of the remote content airing station broadcasting the advertising content at the time of the broadcast; a current temperature dynamic content field to be resolved into the current temperature at a geographic location of the remote content airing station broadcasting the advertising content at the time of the broadcast; and a current weather condition dynamic content field to be resolved into the current weather conditions at the geographic location of the remote content airing station broadcasting the advertising content at the time of the broadcast.

In accordance with another embodiment of the described methods, the one or more dynamic content fields are resolved into static plain text of an advertising content script to be read live on-air at the remote content airing station broadcasting the advertising content; and in which the method further includes capturing a copy of the advertising content script having the content fields resolved into their static plain text at the system for auditing, archival, and validation.

In accordance with another embodiment of the described methods, the one or more dynamic content fields are resolved into static plain text of an advertising content script to be read live on-air at the remote content airing station broadcasting the advertising content; and in which the method further includes validating the broadcast of the advertising content by performing a speech to text conversion of the broadcast to generate a broadcast text output and comparing the broadcast text output with the advertising content script.

In accordance with another embodiment of the described methods, the one or more dynamic content fields to be resolved prior to broadcast of the advertising content includes one or more of: conditional dynamic content fields which identify which one of multiple versions of the advertising content is to be broadcast by the remote content airing station broadcasting the advertising content; in which the conditional dynamic content fields are resolved to determine whether to broadcast a default version of the advertising content or a conditional version of the advertising content from the remote content airing station broadcasting the advertising content at the time of the broadcast.

In accordance with another embodiment of the described methods, the conditional dynamic content fields include one or more of: a conditional selector for one of the multiple versions of the advertising content based on a market size of the content airing station broadcasting the advertising content; a conditional selector for one of the multiple versions of the advertising content based on weather conditions at a geographic location of the content airing station broadcasting the advertising content; a conditional selector for one of the multiple versions of the advertising content based on audience source data for the content airing station broadcasting the advertising content; and a conditional selector for one of the multiple versions of the advertising content based on one or more stock market indices at the time of the broadcast of the advertising content.

In accordance with another embodiment of the described methods, transmitting the copy of the advertising content to the one or more remote content airing stations with scheduling instructions specifying broadcast parameters of the advertising content includes: uploading a copy of the advertising content from the system to a located one of remote content airing stations; issuing instructions to the remote content automation system to schedule the advertising content for broadcast based on the scheduling instructions; and in which the respective one of the remote content airing stations is to responsively broadcast the advertising content uploaded to its remote content automation system at a time defined by the scheduling instructions.

In accordance with another embodiment of the described methods, the system embodies a Synchronicity Platform system having at least the processor and the memory therein, the system having been configured by the instructions for implementing a direct-to-air management and audit platform for dynamic advertising content; and in which the system operates as cloud based on-demand service accessible to a plurality of subscribers via a public Internet.

In accordance with another embodiment of the described methods, managing the advertising content at the system on behalf of a plurality of customers includes: receiving the advertising content at a receive interface from any of an advertising agency, a radio network station, a radio network representing a group of radio stations, an advertising client, and/or a media spot buyer; and persistently storing the advertising content in a data store of the system.

In accordance with another embodiment, such a method further includes: receiving the advertising content at the system via a public Internet; receiving scheduling instructions and advertising content trafficking instructions with the received advertising content; and storing the advertising content, the scheduling instructions, and the advertising content trafficking instructions within a data store local to the system.

In accordance with another embodiment of the described methods, receiving the scheduling instructions and the advertising content trafficking instructions with the received advertising content includes: receiving instructions from a media buyer to traffic the advertising content to a plurality of the one or more remote content airing stations for broadcast at a time or times defined by the media buyer within the advertising content trafficking instructions received by the system.

In accordance with another embodiment of the described methods, each of the plurality of content airing stations includes one or more of: a radio station broadcaster; a radio station network representing a group of radio stations; an internet radio broadcaster; a television station broadcaster; and a television station network representing a group of television stations.

In accordance with another embodiment of the described methods, the advertising content includes one or more of: scripts to be read live on-air by a radio station broadcaster; scripts to be read live on-air by a television station broadcaster; scripts pre-recorded as stored audio for later broadcast by the radio station broadcaster or the television station broadcaster; jingles, sound effects, or audio recordings archived by the system as stored audio for later broadcast by the radio station broadcaster or the television station broadcaster; and sonic branding archived by the system as stored audio for later broadcast by the radio station broadcaster or the television station broadcaster.

In accordance with another embodiment of the described methods, the advertising content includes at least: scripted advertising content or pre-recorded audio advertising content to be broadcast by a radio station broadcaster or a television station broadcaster; and digitized multi-media for transmission to one or more remote computing devices via a public Internet concurrent with broadcast of the advertising content by the radio station broadcaster or the television station broadcaster.

In accordance with another embodiment of the described methods, the advertising content includes one or more of: a government notice; a government alert; a government emergency broadcast; or a school district alert; and in which the method further includes: monitoring one or more government sources for alerts and notifications; and trafficking the alerts and notifications to the one or more remote content airing stations in lieu of the advertising content for inclusion with the broadcast.

In accordance with another embodiment, there is a non-transitory computer readable storage media having instructions stored thereupon that, when executed by a processor of a system, the instructions cause the system to perform operations including: managing advertising content at the system on behalf of a plurality of customers; transmitting a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; receiving an indication at the system from one of the remote content airing stations that the advertising content is to be broadcast; capturing a broadcast of the advertising content for analysis at the system; and validating the broadcast of the advertising content.

Figure 4B:
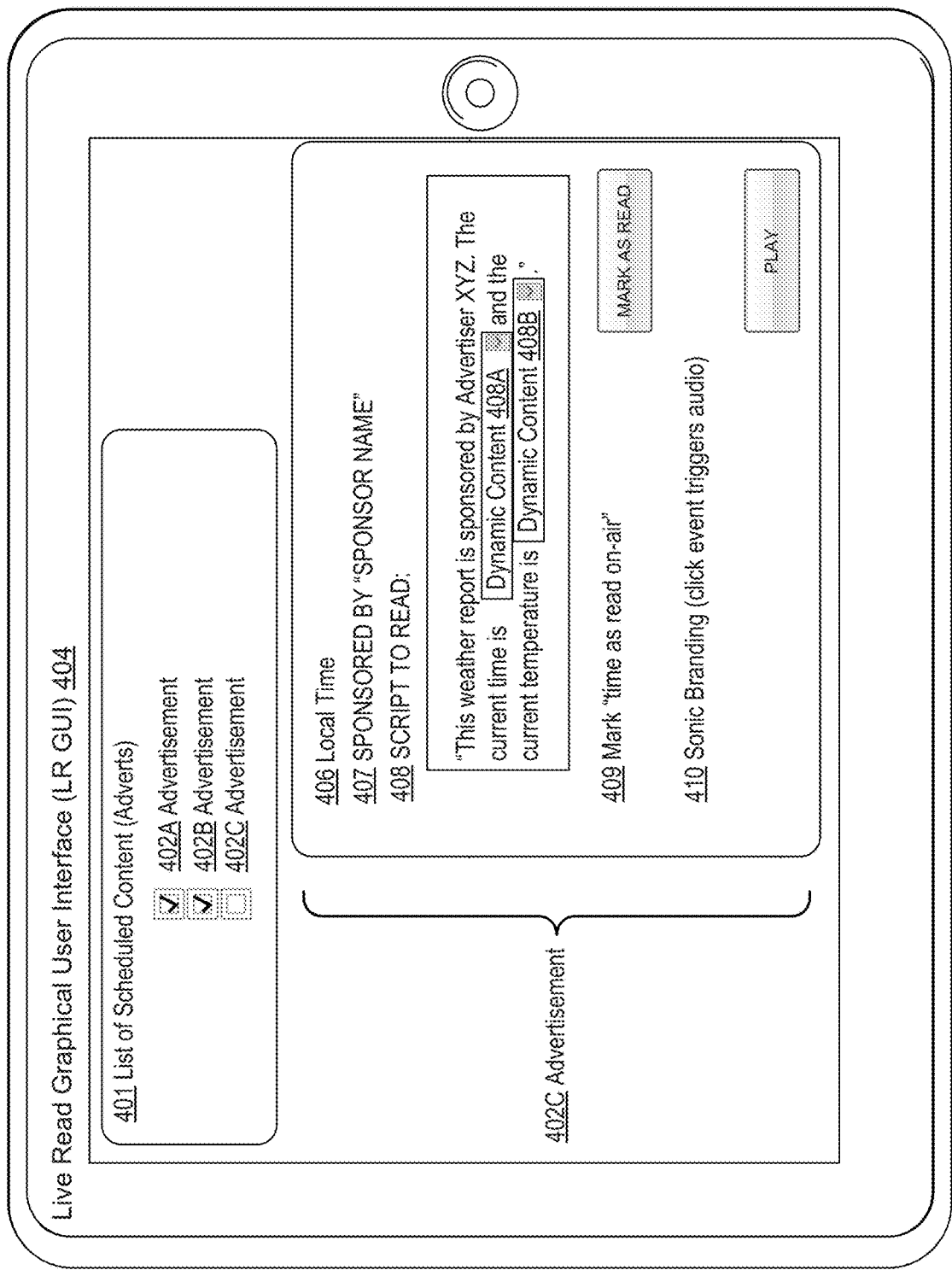
FIG. 4B depicts a Live Read Graphical User Interface (LR GUI) displayed to a user computing device with dynamic content, in accordance with described embodiments.

FIG. 4B depicts a Live Read Graphical User Interface (LR GUI) 404 displayed to a user computing device 499 with dynamic content, in accordance with described embodiments.

According to certain embodiments, on the advertisement production side, any time an advertiser creates a script, the author may add a placeholder within the script as a field. This field then populates from a library and is resolved as plain-text and written into the script, thus replacing the field within the script, at the time the script is to be read by the on-air talent.

Thus, if the time or temperature is to be read out as part of the script, this information simply cannot be known at the time the script is written weeks in advance. Therefore, the script to read at element 408 is created with one or more dynamic content fields, depicted here as dynamic fields 408A and 408B which are embedded into the script for determination later. Such dynamic content 408A-B permits elements of the dynamic script to be generated at the time it is to be read, replacing the placeholder field with the information fetched by the system. So for example, where the script reads "This weather report is sponsored by Advertiser XYZ. The current time is $ {TIME FIELD} . . . " and " . . . the current temperature is $ {TEMPERATURE FIELD} . . . " will be replaced by the system with the current time and temperature. For example, the system may replace the fields with the text "12:05 PM" and the "32 degrees," with such information then being written into the text of the script to be read out live on-air by the talent. Moreover, the dynamically populated script with the fetched information is then additionally saved in its plaintext format, without fields, so as to represent the actual script as read on-air and can thus be accounted for and audited. Therefore, if this advertisement is utilized multiple times, each auditable script will be different, assuming the time of day and temperature is distinct differs each time the dynamic script is utilized.

According to certain embodiments, the dynamic content elements 408A and 408B may be programmed via scripting parameters, such as $ {TIME FIELD} and $ {TEMPERATURE FIELD} as shown above, or the Live Read GUI 404 may provide drag and drop GUI elements, such as drop downs, via which the author of the script to read 408 then click the drop down to select the $ {TEMPERATURE FIELD} or the $ {TIME FIELD} or other available selections provided via a library. These dynamic content elements 408A and 408B are then resolved or determined just prior to the on-air talent reading the script. To be clear, the on-air talent does not see any dynamic field, nor do they need to know that dynamic fields are utilized. Rather, the plain text for the script to read is displayed to the on-air talent and is recorded for archival and auditability purposes as non-dynamic, plain text, subsequent to those dynamic content elements 408A and 408B having been resolved by the Synchronicity platform.

According to described embodiments, the sponsor script is shown in static form, regardless of whether the underlying script is the result of a static script or a dynamic script. Dynamic scripts are resolved by the Synchronicity platform and displayed to the on-air talent as a static script at the particular local content airing station. It is possible for every station in a station group to have a different variation of the same underlying dynamic script, with the Synchronicity platform generating the local static script for each station. For instance, the local temperature may be inserted as discussed above, or a local pricing scheme, or a local business name may be provided, and may be different depending on the market, etc.

Figure 5A:
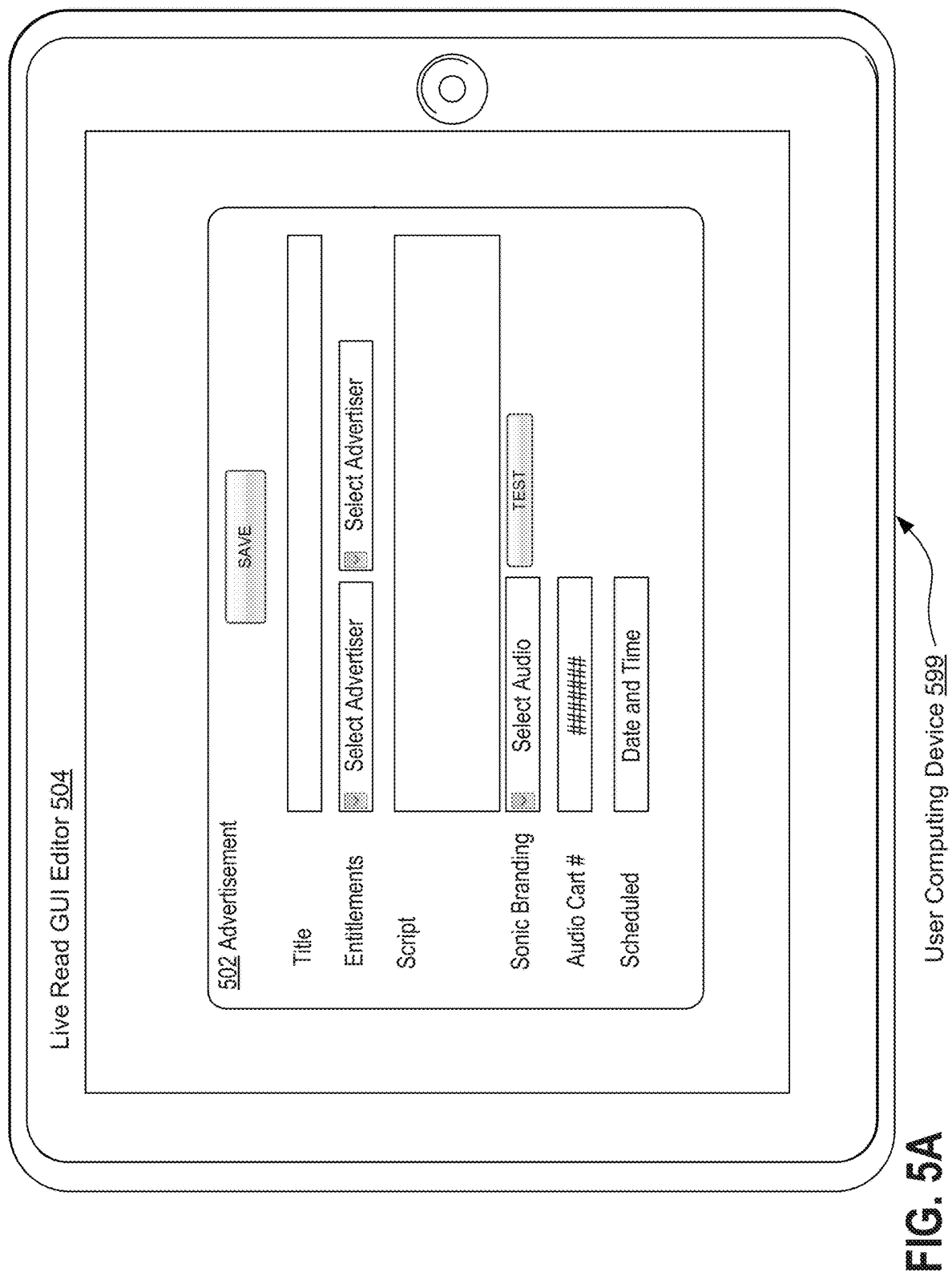
FIGS. 5A and 5B depict a Live Read GUI editor interface displayed to a user computing device and the optional use of conditional programming, in accordance with described embodiments.
Figure 5B:
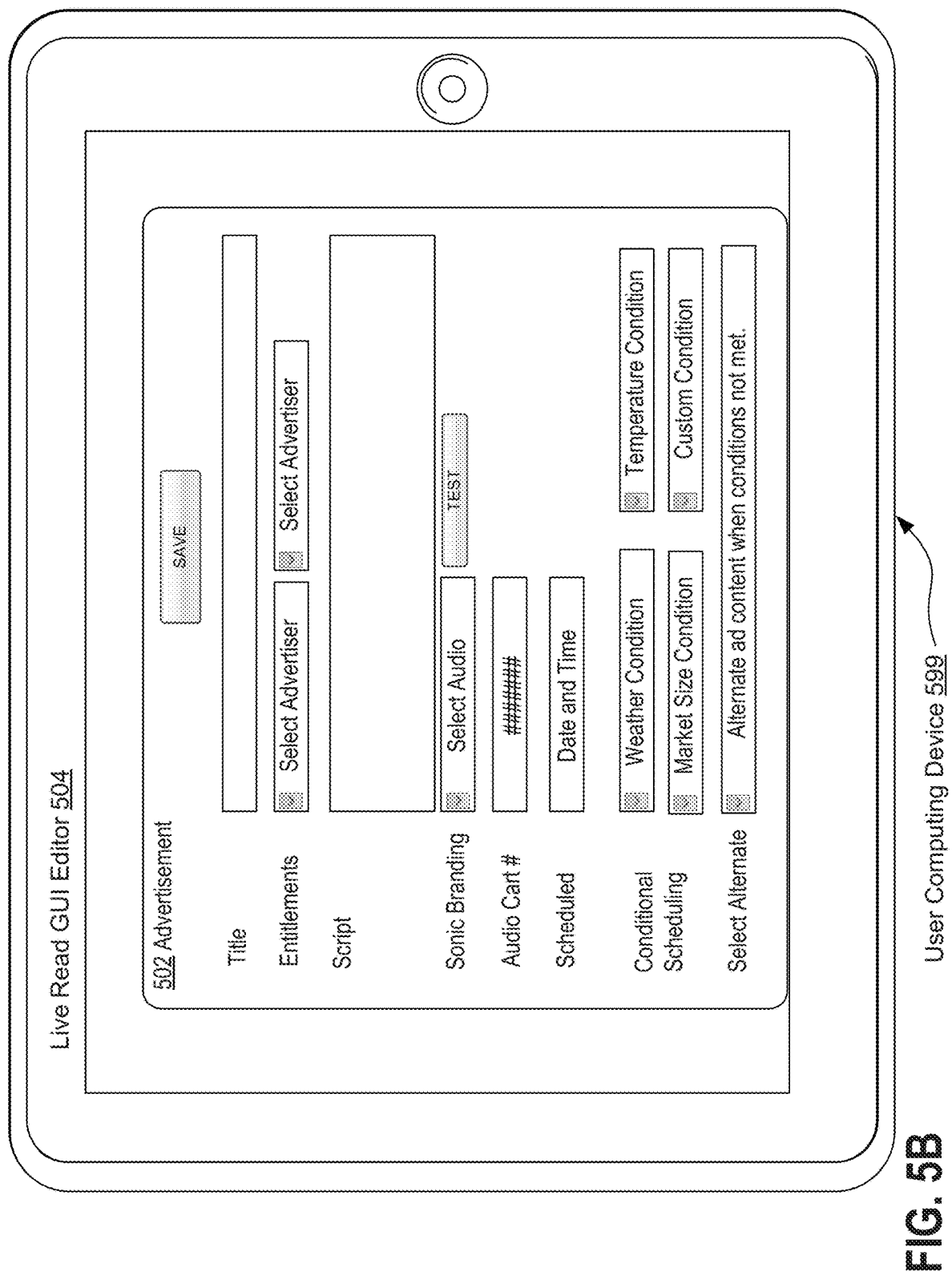

FIGS. 5A and 5B depict a Live Read GUI editor 504 interface displayed to a user computing device 599 and the optional use of conditional programming, in accordance with described embodiments.

Beginning with FIG. 5A, users may create advertisements utilizing the Live Read GUI editor 504 which is shown here as editing advertisement 502. There are included here, fields to enter a title, entitlement drop downs for one or more advertisers, a script to be read (which may incorporate dynamic content), a drop down to select audio for sonic branding (e.g., to play a jingle, etc.), a test button to play the selected audio during the advertisement editing phase, as well as an audio cart identifier field for the content and a scheduled date and time. Additional configuration fields may be added depending upon the implementation.

The dropdown elements will populate automatically based upon available objects and resources within a given folder or directory structure for the selected advertiser. Therefore, if the advertiser Dodge Ram is selected, then sonic branding options associated with that particular advertiser will be displayed as available for selection via the sonic branding drop down box depicted here.

With regard to FIG. 5B, it is additionally shown that users may create various conditions for scheduled advertising content, which are configurable through the Live Read GUI editor 504.

As shown here, there is now depicted in addition to the basic configuration options, certain conditional scheduling options, such as selecting weather conditions (e.g., rainy, cloudy, sunny, etc.), temperature conditions (e.g., above or below a specified temperature), market size conditions (e.g., market for this content airing station is above or below a specified market size), or custom conditions. There is further depicted a dropdown to select an alternative or default advertisement content or spot which is to be utilized in the event that conditions are otherwise not met.

For instance, it is therefore possible to create two different kinds of scripts to be read live via the on-air talent. For example, an advertiser may create a rainy day script and a sunny day script, and the content of the script that is to be read out on-air is different based on the weather, or some other unknown event which cannot be known in advance, but may be dynamically determined at the time the advertisement is scheduled for air. Thus, the display of the script to read (e.g., refer to element 408 of FIG. 4A) may be one of potentially several available conditional scripts to be read out on-air is decided by the system immediately before it is to be read, when the on-air talent initiates the on-air reading of the advertisement (e.g., by opening the ad for reading or by clicking a "click to read" button to initiate the display, etc.).

Such a decision point is made by selecting or specifying available configuration parameters in the production file via the Live Read GUI editor 504.

For example, the creator of the advertisement may utilize the Live Read GUI editor 504 to identify different scripts to be read in the event of varying weather conditions, such as rain, snow, cloudy, and sunny weather, etc. Each condition is defined based on, for example the station's geographically tied area which is then compared with the weather for that area, the temperature for that area, the market size for that area, or some other custom specified condition associated with the geographic area within which that content airing station resides.

For example, if market research reveals that audience numbers for a station are coming from long island, and yet the station is in Manhattan, then a market size condition may be specified or a market audience source condition may be custom configured, etc. Similarly, if the Stock market is up or down on the day at the time that the script is to be read, such a condition may be specified so as to select from amongst multiple available scripts. Such a decision point may be applied to any commercial or advertising spot which is stored by the Synchronicity platform and system, whether such content is pre-recorded or scripted for on-air talent reading at the time of broadcast.

Figure 6A:
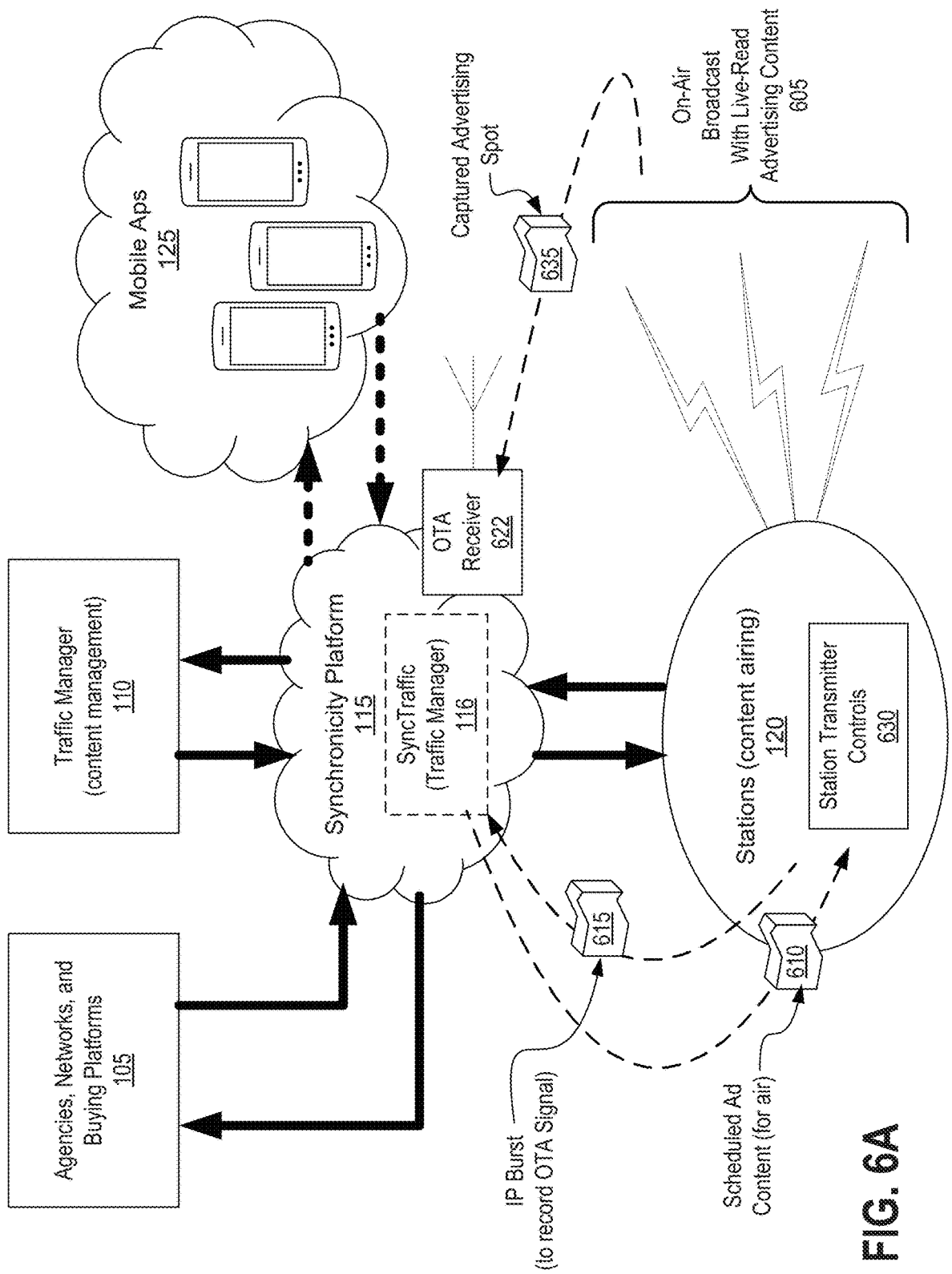
FIG. 6A depicts additional interactions between the synchronicity platform and the content airing stations, in accordance with described embodiments.

FIG. 6A depicts additional interactions between the Synchronicity platform 115 and the content airing stations 120.

In particular, the Synchronicity platform 115 may implement an Over The Air (OTA) receiver 622 via which to capture on-air broadcast signals within which the live read-advertising content 605 is embedded via the broadcast from the content airing stations. In such a way, the Synchronicity platform 115 may both schedule advertising content to be performed by the stations 120 and then capture the resulting advertising content as performed, played, and broadcast by the respective content airing stations.

According to a certain embodiment, the Synchronicity platform 115 first schedules ad content for air 610 by the content airing stations 120 and then listens for an IP burst signal 615 or message from the respective station 120 indicating to the Synchronicity platform 115 that particular scheduled advertising content is being broadcast, thus initiating the Synchronicity platform 115 to record the OTA signal via its OTA receiver 622 for the purposes of archival of the aired content, auditing, billing, and quality control. In alternative embodiments, an IP radio stream feed may be captured in addition to the OTA signal or as an alternative, or a local digitized feed from the station 120 may be captured at the station and then transmitted to the Synchronicity platform 115 as validation. However, recording the OTA signal with the embedded advertising content is considered a key validation mechanism since the control of the audio capture is independent from the control of the on-air broadcast 605.

According to a particular embodiment, when a scheduled ad content 610 is opened permitting viewing of the script to be read on-air, the IP burst may be automatically triggered, thus signaling via the IP burst 615 to the Synchronicity platform 115 that the advertising spot is about to be performed. In such a way, the Synchronicity platform 115 has a copy of the performed advertising content which is then archived and made available to the client via the dashboard for quality control, auditing, and verification operations.

In certain embodiments, a captured advertising spot 635 is further subjected to voice analysis via which speech to text transcribes the speak to text and then compares the captured and transcribed text with the scheduled script. Similarly, the Synchronicity platform 115 may analyze the recorded over the air audio validate and verify proof of play of the audio jingle or other specified sonic branding audio scheduled to be broadcast with the scheduled advertising content.

For example, scheduled ad content 610 is uploaded to the stations 120 from the Synchronicity platform 115 and ultimately broadcast by the stations 120 via the station transmitter controls 630 which plays or broadcasts the scheduled advertising content over the airwaves. The captured advertising spot 635 is then captured by the Synchronicity platform 115 and analyzed via the air check analyzer 640 to validate the script contents, the quality of the broadcast, the pronunciation, and other quality control parameters.

According to certain embodiments, the IP Burst 615 is configured as a signal, message, or indicator from a source computer (such as the content airing station) to a target computer, such as a server of the Synchronicity platform 115. For example, the IP burst may be pushed from a sync ad server to the computing device where the on-air talent's display is provided. While capable of providing for remote control of non-local machines, the Synchronicity platform 115 pre-configures the IP burst to transmit through multiple systems when activated, in accordance with certain embodiments. In such a way, a device which communicates with the Synchronicity platform 115 website or dashboard may transmit a message to the Synchronicity platform 115 pertaining to advertising content identified by a cart number which is then to be stored within the Synchronicity platform 115. Consequently, the advertising content is archived at the Synchronicity platform 115 and accessible via the Synchronicity platform's long-term storage archives.

Sending data in the reverse direction via IP burst functionality is additionally implemented in accordance with certain embodiments, for instance, to trigger and play the sonic branding audio which is associated with certain advertising content. For example, the advertising content when created via the Synchronicity platform 115 may be configured with a "play button" which has embedded metadata defining (e.g., by cart number), which audio source is to be played. Consequently, the play button will, responsive to a click event at the play button, transmit the cart number identifier from the computing device where the advertising script and play button is displayed to the on-air talent to synchronicity servers local to the content airing station, triggering the corresponding audio to be played through the soundboard of the station and then broadcast over the air live. The play button may be further configured to transmit, as part of the IP burst, a signal to the Synchronicity platform 115 servers remote from the station indicating a play button event has occurred at the station for the specified cart number, without transmitting the audio itself back to the Synchronicity platform 115, which should already have an exact digital copy.

According to a particular embodiment, the IP burst is configured transmit the cart number information and request to play the sonic branding audio directly to a pre-configured IP address and PORT, which then responsively plays over the station's soundboard, everything within identified cart number. The playback event, time, and associated information for the advertising content is then reconciled back to the Synchronicity platform 115 in real time to validate that the correct item was played and that it was played at the correct time. The hardware may further generate a specific log file that is immediately reported back to the Synchronicity platform 115 separately indicating what was played and how long the audio played (e.g., down to 3 decimal places) to confirm based on the length and the name.

Figure 6B:
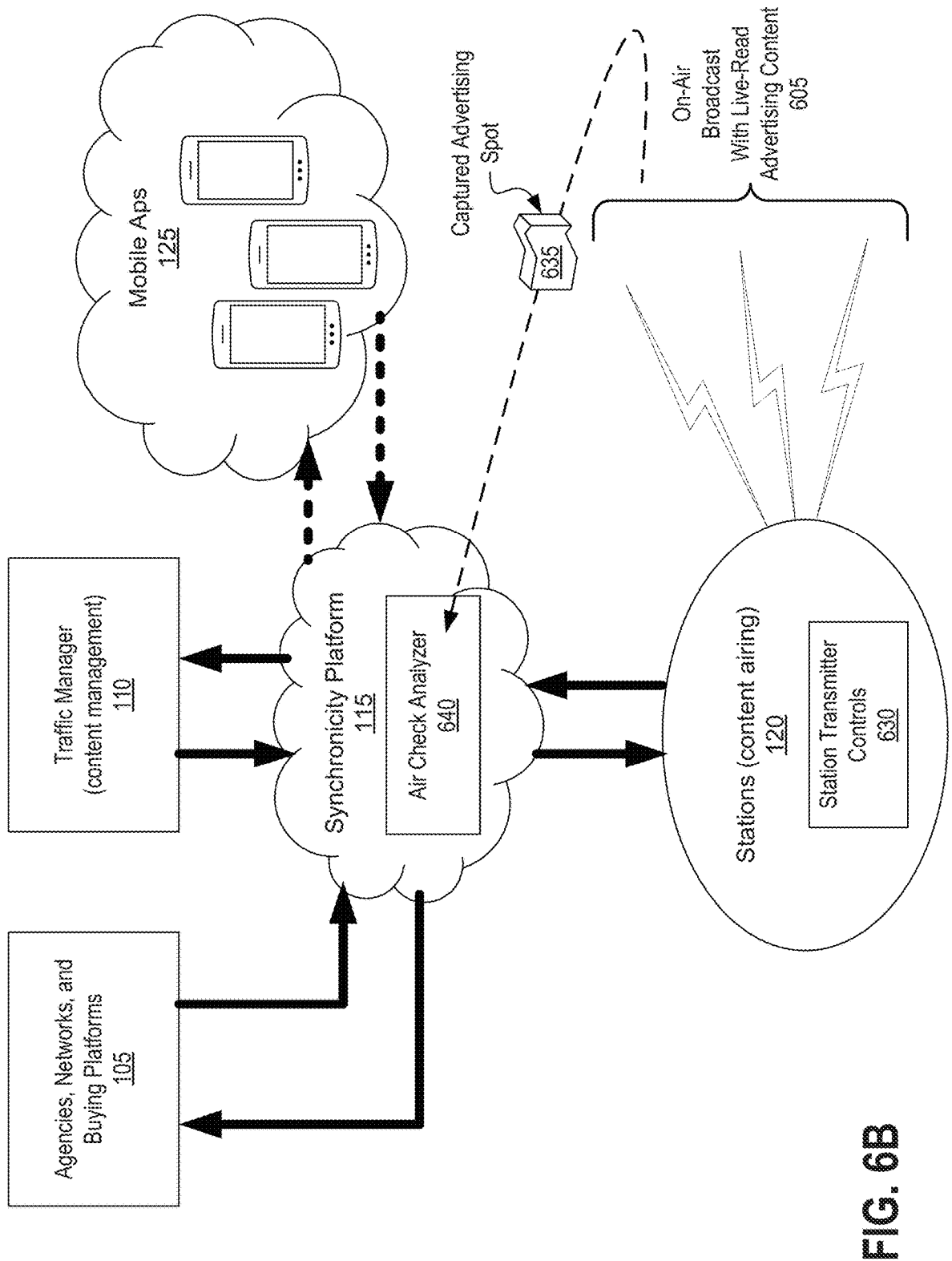
FIG. 6B depicts an air check analyzer at the Synchronicity platform utilized to analyze and validate captured advertising content broadcast by the stations, in accordance with described embodiments.

FIG. 6B depicts an air check analyzer at the Synchronicity platform 115 utilized to analyze and validate captured advertising content broadcast by the stations.

As depicted here, an air check analyzer at the Synchronicity platform 115 may be utilized to perform so-called "air checks" via which the Synchronicity platform 115 captures the advertising spot 635 and then subjects the captured spot to automated analysis or provides the captured advertising spot for manual analysis via the traffic management dashboard available to clients. For instance, all advertising spots may be subjected to analysis for the purpose of script comparison and audio comparison, however, advertisers may wish to check and verify that their brand-name or company name is being pronounced correctly, and thus, by clicking on a link for the captured spot at the traffic management dashboard, the advertiser, client, or other persons may play the captured spot and listen to the pronunciation of their name, listen to the reading of the script, listen to the jingle or other audio as broadcast, or perform some other quality review or validation scheme as they deem appropriate.

According to certain embodiments, the air check analyzer will trigger recording and capture of an advertising spot as upon a script being opened for viewing and thus ready to be read, resulting in a pre-buffer of audio leading into the advertising spot, and a configurable post-buffer after reading of the advertising spot, indicated based on the on-air talent clicking on the "mark as read" button. In other instances, a button to initiate performance of the advertisement is provided to the on-air talent, in which case the on-air talent clicks the "begin to read" button, and this click event thus triggers the start of recording. However, an automated system (e.g., recording when the script is displayed) may be the configured default so as to ensure that all advertising spots are recorded, regardless of any affirmative action by the on-air talent.

Such captured advertising spots 635 are then stored as part of the archival and made available to the client via the traffic dashboard for the sake of auditing, billing, historical reference, and so forth.

FIG. 6C depicts an alert generator 685 at the Synchronicity platform 115 which is utilized to dynamically create alerts for radio and television broadcast, in accordance with certain embodiments.

As depicted here, there is further shown at the Synchronicity platform 115, an alert generator 685 which communicates with various government notice systems on both a push and a pull basis to either receive or to monitor and retrieve various official alerts.

There are a variety of official government alert systems or Government Notice Systems 686 which include, for example, the Common Alerting Protocol (CAP) and associated systems, the Emergency Alert System (EAS), the Specific Area Message Encoding (SAME) alert system, the NOAA Weather Radio (NWR) alert system, the AMBER alert and child abduction emergency alerts systems, as well as a variety of local and state level alerting systems, such as school district alerts for weather and school closures, school emergencies, etc.

Problematically, not all of these systems manage to provide notice to their target audience. One problem is that certain systems, such as school closure notifications do not utilize the federal emergency alert systems and thus, many people who would benefit from the information in a local radio market may simply not be aware of the notice, unless they go to that specific school district website and check for the information.

Still other systems provide a text to speak read out which is pushed into a broadcast stream, but may not reach as great of an audience as is appropriate.

Yet another problem is that certain markets are of insufficient size to read out a text based notification received (e.g., over an AP wire or via alternative notification systems) and thus, the message may not be capable of being broadcast, whereas larger markets (such as Los Angeles or New York City) will have on-air talent available any time to provide the text based notice via spoken language over the air.

It is therefore in accordance with certain embodiment that the alert generator 685 at the Synchronicity platform 115 both pulls data from various alert systems (e.g., such as a web-retrieval or a database query to relevant government systems) and also monitors and receives data from government systems and other alert sources which push the alerts to the radio station.

Various conversions are then permissible to produce dynamically generated alerts 687 which are then scheduled and trafficked to the content airing stations 120. For instance, where on-air talent is available, the Synchronicity platform 115 may schedule the dynamically generated alerts 687 to be read live on-air (e.g., by scheduling as advertising content) in which case text based alerts are embedded into a script and prompted to the GUI of a computing device utilized by the on-air talent to be read. Where audio based alerts are retrieved, the Synchronicity platform 115 may utilize speech to text recognition to generate text which is then embedded into a script for on-air read out by the talent. Alternatively, audio messages received may be broadcast by embedding the dynamically generated alerts 687 into a sonic branding audio file and scheduling them to be broadcast or permitting the on-air talent to simply click the "play" clickable event to initiate the playback for broadcast.

Where on-air talent is not available, the broadcast may nevertheless be automated, in which case text based messages are provided within a script to be read via a computer synthesized voice for on-air broadcast or embedded within a sonic branding audio file for broadcast. Audio based alerts are simply embedded into a sonic branding audio file and then broadcast via an automatic scheduling rule which gives priority to official alerts, such as those listed above or other alerts white-listed by the Synchronicity platform 115 or the content airing station.

According to certain embodiments, time and temperature announcements are pre-scheduled on an iterative basis for a given content airing station using dynamic content fields, and the alerts are inserted into these time and temp fields for live on-air reads or are injected into sonic branding audio associated with time and temperature status updates already scheduled, effectively forcing the alert to be played out in addition to or in place of the time and temperature announcements for that content airing station.

FIG. 7 depicts an exemplary sponsor script access log, including a time stamp for the script at the time it is marked "performed," and time stamps for the sponsor script for every "Opened" and "Closed" event, including the person accessing the sponsor script.

Figure 8:
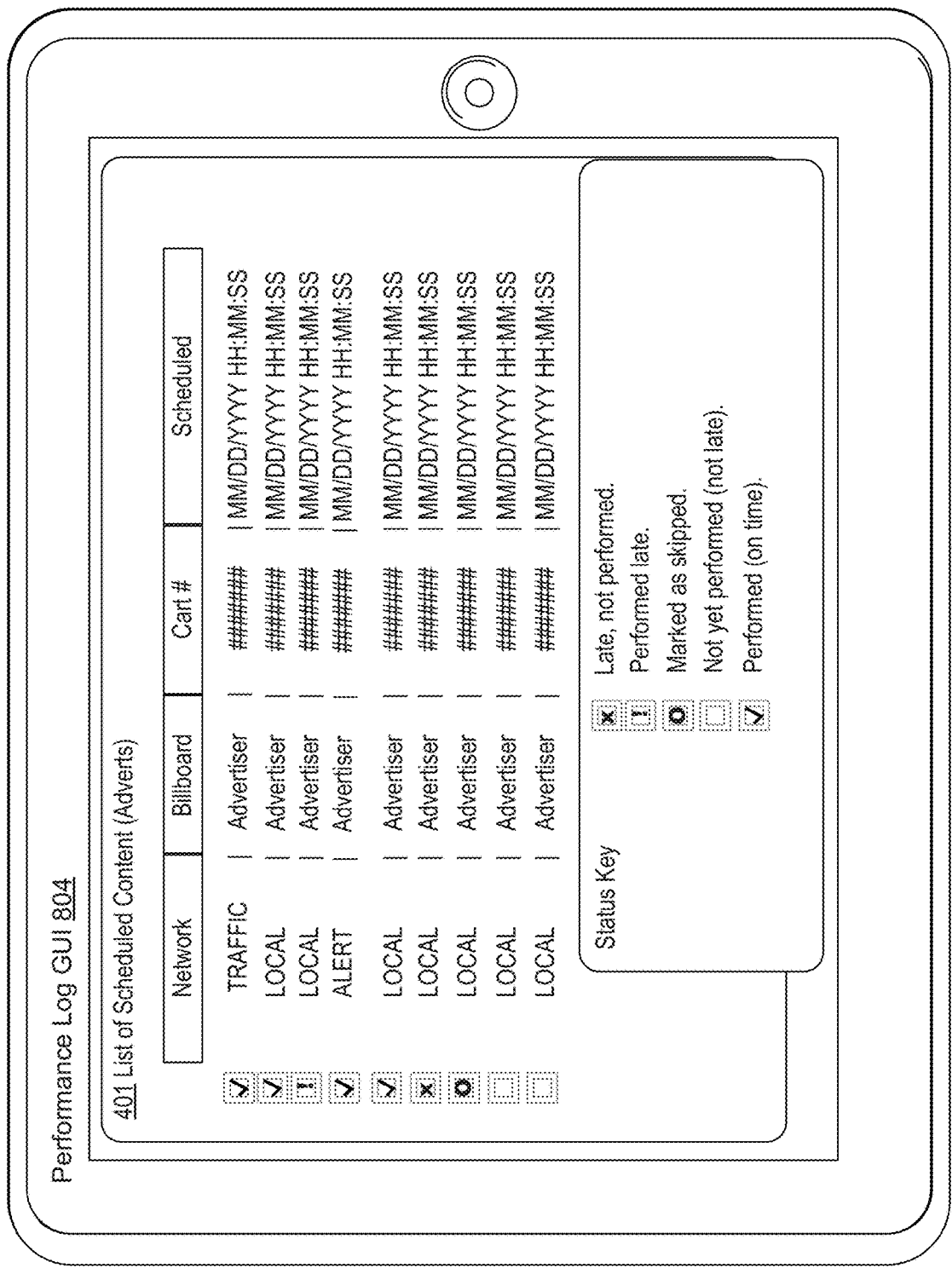
FIG. 8 depicts an exemplary sponsor script status log and status key, in accordance with described embodiments.

FIG. 8 depicts an exemplary sponsor script status log and status key, including those scripts "late, not performed," or "performed late," or "marked as skipped" or "not yet performed" or "performed (on time)," as displayed to the GUI of the user computing device 899.

Figure 9:
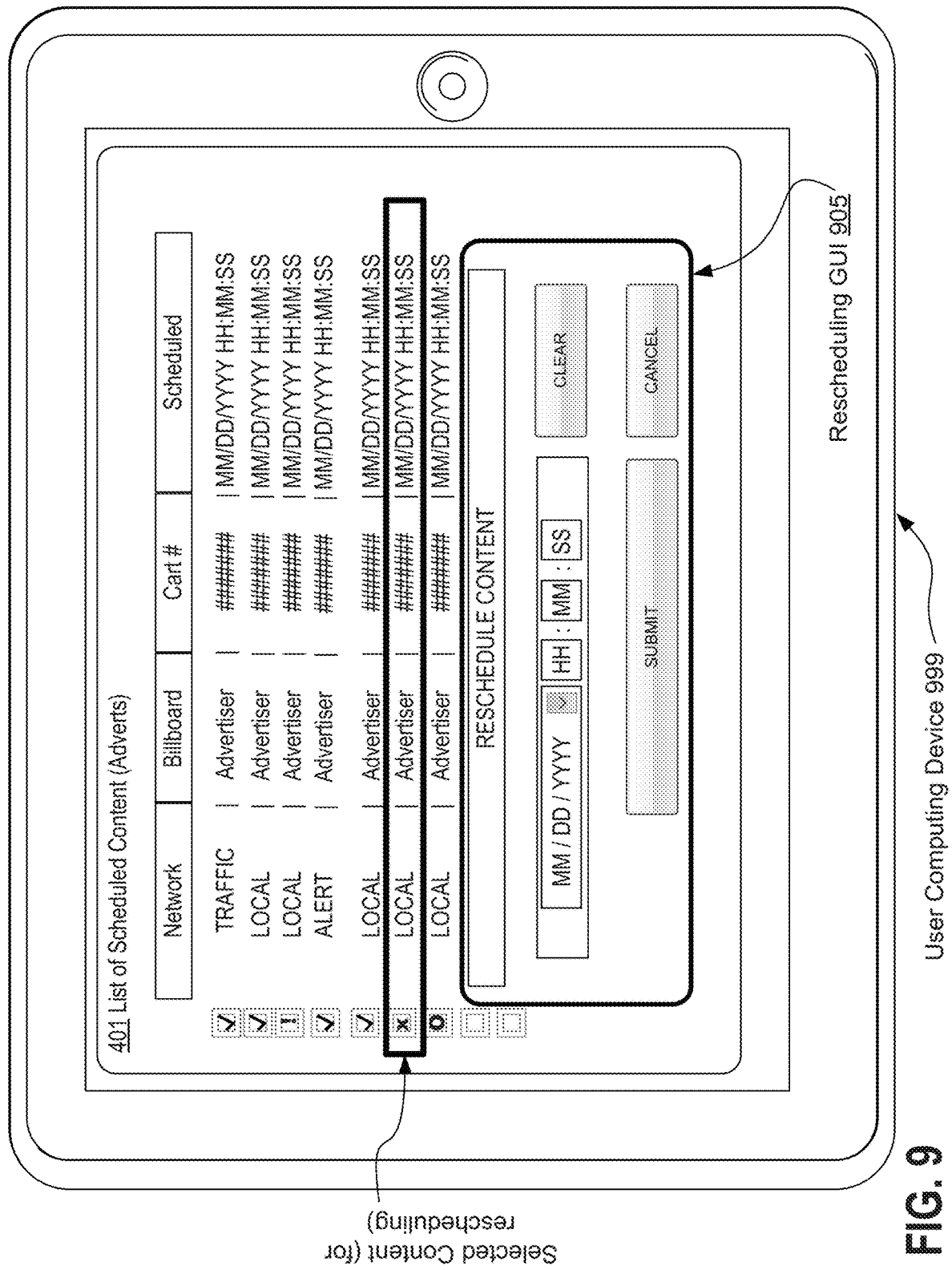
FIG. 9 depicts an exemplary reschedule GUI interface via which advertisers, station, traffic managers, etc., may reschedule an advertising spot, in accordance with described embodiments.

FIG. 9 depicts an exemplary Rescheduling GUI 905 interface via which advertisers, station, traffic managers, etc., may re-schedule an advertising spot, with such changes then being synchronized back to the Synchronicity platform dashboard available to the content advertiser, client, or ad agency, as appropriate. As shown here, a particular advertisement is selected for rescheduling and then the rescheduling GUI 905 is utilized to change the scheduled time for the trafficked advertising content at the user computing device 999.

Figure 10:
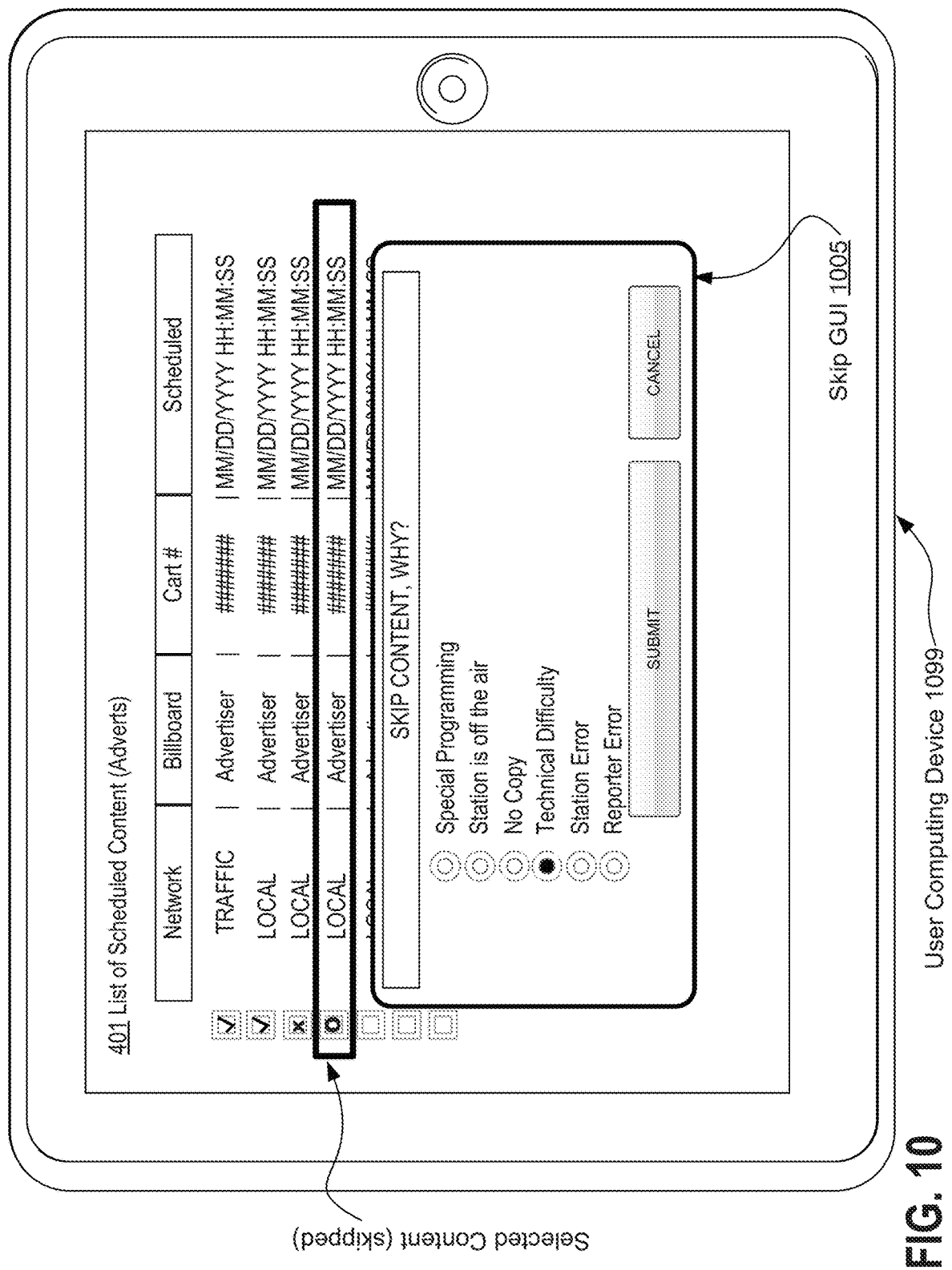
FIG. 10 depicts an exemplary skip GUI interface via which advertisers, station, traffic managers, etc., may enter the reason why an advertising spot was skipped, in accordance with described embodiments.

FIG. 10 depicts an exemplary skip GUI 1005 via which advertisers, station, traffic managers, etc., may enter the reason why an advertising spot was skipped or via which they may mark a previously scheduled advertisement to be skipped at the user computing device 1099. As shown here, the selected content was skipped and the skip GUI 1005 indicates the reason as "technical difficulty," with such detail then being synchronized back to the Synchronicity platform dashboard available to the content advertiser, client, or ad agency, as appropriate.

FIG. 11 illustrates a diagrammatic representation of a machine 1100 in the exemplary form of a computer system, in accordance with one embodiment.

According to such an embodiment, the machine 1100 implements a set of instructions, for causing the machine 1100 to perform any one or more of the methodologies discussed herein, may be executed. In alternative embodiments, the machine may be connected, networked, interfaced, etc., with other machines in a Local Area Network (LAN), a Wide Area Network, an intranet, an extranet, or the Internet. The machine may operate in the capacity of a server or a client machine in a client-server network environment, or as a peer machine in a peer-to-peer (or distributed) network environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processor 1102, a main memory 1104 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), etc.), and a secondary memory 1118, which communicate with each other via a bus 1130. Main memory 1104 includes information and instructions and software program components necessary for performing and executing the functions with respect to the various embodiments of the systems, methods for implementing a direct-to-air management and audit platform for dynamic advertising content as described herein. Instructions 1123 implement the above described functionality of the Synchronicity platform 1124 and are operable in conjunction with the advertiser interface 1134 and the traffic interface 1135 as described herein. Further interfaces are provided to broadcast stations and station groups as described above. Instructions 1123 may be stored within main memory 1104. Main memory 1104 and its sub-elements (e.g. instructions 1123 and the interface to the centralized Synchronicity platform 1124 which provides direct-to-air management and audit platform for dynamic advertising content are operable in conjunction with processing logic 1126 and/or software 1122 and processor 1102 to perform the methodologies discussed herein, each of which being operable in conjunction with the interfaces 1134 and 1135 to carry out the described functions.

Processor 1102 represents one or more general-purpose processing devices such as a microprocessor, central processing unit, or the like. More particularly, the processor 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1102 may also be one or more special-purpose processing devices such as an application specific integrated circuit (ASIC), a field programmable gate array (FPGA), a digital signal processor (DSP), network processor, or the like. Processor 1102 is configured to execute the processing logic 1126 for performing the operations and functionality which are discussed herein.

The computer system 1100 may further include one or more network interface cards 1108 to interface with the computer system 1100 with one or more networks 1120. The computer system 1100 also may include a user interface 1110 (such as a video display unit, a liquid crystal display (LCD), or a cathode ray tube (CRT)), an alphanumeric input device 1112 (e.g., a keyboard), a cursor control device 1114 (e.g., a mouse), and a signal generation device 1116 (e.g., an integrated speaker). The computer system 1100 may further include peripheral device 1136 (e.g., wireless or wired communication devices, memory devices, storage devices, audio processing devices, video processing devices, etc.). The computer system 1100 may perform the functions of determining and instructing a traffic signal to carry out the green lights activity and phase timings as determined by such a system 1000 as described herein.

The secondary memory 1118 may include a non-transitory machine-readable storage medium (or more specifically a non-transitory machine-accessible storage medium) 1131 on which is stored one or more sets of instructions (e.g., software 1122) embodying any one or more of the methodologies or functions described herein. Software 1122 may also reside, or alternatively reside within main memory 1104, and may further reside completely or at least partially within the processor 1102 during execution thereof by the computer system 1100, the main memory 1104 and the processor 1102 also constituting machine-readable storage media. The software 1122 may further be transmitted or received over a network 1120 via the network interface card 1108.

For instance, there is a particular embodiment of such a system, in which the system includes at least, a processor; a memory to execute instructions; a traffic manager to manage advertising content at the system on behalf of a plurality of customers; a receive interface to receive the advertising content; a persistent data store to store the received advertising content; a network transmitter to transmit a copy of the advertising content to one or more remote content airing stations with scheduling instructions specifying broadcast parameters of the advertising content; in which the advertising content embodies one or more dynamic content fields to be resolved prior to broadcast of the advertising content from any of the one or more remote content airing stations; in which the receive interface is to further receive an indication at the system from one of the remote content airing stations that the advertising content is to be broadcast; an air check analyzer to capture a broadcast of the advertising content for analysis at the system; and in which the air check analyzer further is to validate the broadcast of the advertising content.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein to execute instructions, wherein the method comprises:

managing advertising content at the system on behalf of a plurality of customers, wherein the advertising content comprises at least (i) scripted advertising content or pre-recorded audio advertising content to be broadcast by a radio station broadcaster or a television station broadcaster and (ii) digitized multi-media for transmission to one or more remote computing devices via a public Internet concurrent with broadcast of the advertising content by the radio station broadcaster or the television station broadcaster;

transmitting a copy of the advertising content to one or more remote content airing stations with scheduling instructions specifying broadcast parameters of the advertising content;
wherein the advertising content embodies one or more dynamic content fields to be resolved prior to broadcast of the advertising content from any of the one or more remote content airing stations;
receiving an indication at the system from one of the remote content airing stations that the advertising content is to be broadcast;
capturing a broadcast of the advertising content for analysis at the system; and
validating the broadcast of the advertising content.

2. The method of claim 1, further comprising:
displaying the advertising content in a script format to a GUI of a user computing device at the content airing station to broadcast the advertising content;
displaying a first clickable button at the GUI of the user computing device to mark the advertising content as having been read live on-air as part of the broadcast; and
displaying a second clickable button at the GUI of the user computing device to trigger playback of sonic branding audio through a soundboard of the content airing station to broadcast the advertising content.

3. The method of claim 2, further comprising:
receiving a first click event of the first clickable button indicating the advertising content has been marked as read live on-air as part of the broadcast and recording a time of broadcast of the advertising content for audit and validation of the broadcast; and
receiving a second click event of the second clickable button indicating the playback of the sonic branding audio has been initiated, wherein the second click event triggers an IP burst of the sonic branding audio to the soundboard of the content airing station which broadcasts the sonic branding audio live on-air as part of the broadcast of the advertising content.

4. The method of claim 1, wherein the one or more dynamic content fields to be resolved prior to broadcast of the advertising content comprises one or more of:
a current time dynamic content field to be resolved into the current time of the remote content airing station broadcasting the advertising content at the time of the broadcast;
a current temperature dynamic content field to be resolved into the current temperature at a geographic location of the remote content airing station broadcasting the advertising content at the time of the broadcast; and
a current weather condition dynamic content field to be resolved into the current weather conditions at the geographic location of the remote content airing station broadcasting the advertising content at the time of the broadcast.

5. The method of claim 4:
wherein the one or more dynamic content fields are resolved into static plain text of an advertising content script to be read live on-air at the remote content airing station broadcasting the advertising content; and
wherein the method further comprises capturing a copy of the advertising content script having the content fields resolved into their static plain text at the system for auditing, archival, and validation.

6. The method of claim 4:
wherein the one or more dynamic content fields are resolved into static plain text of an advertising content script to be read live on-air at the remote content airing station broadcasting the advertising content; and
wherein the method further comprises validating the broadcast of the advertising content by performing a speech to text conversion of the broadcast to generate a broadcast text output and comparing the broadcast text output with the advertising content script.

7. The method of claim 1, wherein the one or more dynamic content fields to be resolved prior to broadcast of the advertising content comprises one or more of:
conditional dynamic content fields which identify which one of multiple versions of the advertising content is to be broadcast by the remote content airing station broadcasting the advertising content;
wherein the conditional dynamic content fields are resolved to determine whether to broadcast a default version of the advertising content or a conditional version of the advertising content from the remote content airing station broadcasting the advertising content at the time of the broadcast.

8. The method of claim 7; wherein the conditional dynamic content ds comprise one or more of:
a conditional selector for one of the multiple versions of the advertising content based on a market size of the content airing station broadcasting the advertising content;
a conditional selector for one of the multiple versions of the advertising content based on weather conditions at a geographic location of the content airing station broadcasting the advertising content;
a conditional selector for one of the multiple versions of the advertising content based on audience source data for the content airing station broadcasting the advertising content; and
a conditional selector for one of the multiple versions of the advertising content based on one or more stock market indices at the time of the broadcast of the advertising content.

9. The method of claim 1, wherein transmitting the copy of the advertising content to the one or more remote content airing stations with scheduling instructions specifying broadcast parameters of the advertising content comprises:
uploading a copy of the advertising content from the system to a located one of remote content airing stations;
issuing instructions to the remote content automation system to schedule the advertising content for broadcast based on the scheduling instructions; and
wherein the respective one of the remote content ring stations is to responsively broadcast the advertising content uploaded to its remote content automation system at a time defined by the scheduling instructions.

10. The method of claim 1:
wherein the system embodies a Synchronicity Platform system having at least the processor and the memory therein, the system having been configured by the instructions for implementing a direct-to-air management and audit platform for dynamic advertising content; and
wherein the system operates as cloud based on-demand service accessible to a plurality of subscribers via a public Internet.

11. The method of claim 1, wherein managing the advertising content at the system on behalf of a plurality of customers comprises:
receiving the advertising content at a receive interface from any of an advertising agency, a radio network station, a radio network representing a group of radio stations, an advertising client, and/or a media spot buyer; and persistently storing the advertising content in a data store of the system.

12. The method of claim 1, further comprising:

receiving the advertising content at the system via a public Internet;

receiving scheduling instructions and advertising content trafficking instructions with the received advertising content; and storing the advertising content; the scheduling instructions, and the advertising content trafficking instructions within a data store local to the system.

13. The method of claim 12, wherein receiving the scheduling instructions and the advertising content trafficking instructions with the received advertising content comprises:

receiving instructions from a media buyer to traffic the advertising content to a plurality of the one or more remote content airing stations for broadcast at a time or times defined by the media buyer within the advertising content trafficking instructions received by the system.

14. The method of claim 1, wherein each of the plurality of content airing stations comprises one or more of:

a radio station broadcaster;

a radio station network representing a group of radio stations;

an internet radio broadcaster;

a television station broadcaster; and a television station network representing a group of television stations.

15. The method of claim 1, wherein the advertising content comprises one or more of:

scripts to be read live on-air by a radio station broadcaster;

scripts to be read live on-air by a television station broadcaster;

scripts pre-recorded as stored audio for later broadcast by the radio station broadcaster or the television station broadcaster;

jingles, sound effects, or audio recordings archived by the system as stored audio for later broadcast by the radio station broadcaster or the television station broadcaster; and sonic branding archived by the system as stored audio for later broadcast by the radio station broadcaster or the television station broadcaster.

16. The method of claim 1, wherein the advertising content comprises one or more of:

a government notice;

a government alert;

a government emergency broadcast; or a school district alert; and wherein the method further comprises:

monitoring one or more government sources for alerts and notifications; and trafficking the alerts and notifications to the one or more remote content airing stations in lieu of the advertising content for inclusion with the broadcast.

17. Non-transitory computer readable storage media having instructions stored thereupon that, when executed by a processor of a system, the instructions cause the system to perform operations including:

managing advertising content at the system on behalf of a plurality of customers, wherein the advertising content comprises at least (i) scripted advertising content or pre-recorded audio advertising content to be broadcast by a radio station broadcaster or a television station broadcaster and (ii) digitized multi-media for transmission to one or more remote computing devices via a public Internet concurrent with broadcast of the advertising content by the radio station broadcaster or the television station broadcaster;

transmitting a copy of the advertising content to one or more remote content airing stations with scheduling instructions specifying broadcast parameters of the advertising content;

wherein the advertising content embodies one or more dynamic content fields to be resolved prior to broadcast of the advertising content from any of the one or more remote content airing stations;

receiving an indication at the system from one of the remote content airing stations that advertising content is to be broadcast;

capturing a broadcast of the advertising content for analysis at the system; and validating the broadcast of the advertising content.

18. The non-transitory computer readable storage media of claim 17, wherein the instructions, when executed, cause the system to perform operations further comprising:

displaying the advertising content in a script format to a GUI of a user computing device at the content airing station to broadcast the advertising content;

displaying a first clickable button at the GUI of the user computing device to mark the advertising content as having been read live on-air as part of the broadcast; and displaying a second clickable button at the GUI of the user computing device to trigger playback of sonic branding audio through a soundboard of the content airing station to broadcast the advertising content.

19. A system comprising:

a processor;

a memory to execute instructions;

a traffic manager to manage advertising content at the system on behalf of a plurality of customers, wherein the advertising content comprises at least (i) scripted advertising content or pre-recorded audio advertising content to be broadcast by a radio station broadcaster or a television station broadcaster and (ii) digitized multi-media for transmission to one or more remote computing devices via a public Internet concurrent with broadcast of the advertising content by the radio station broadcaster or the television station broadcaster;

a receive interface to receive the advertising content;

a persistent data store to store the received advertising content;

a network transmitter to transmit a copy of the advertising content to one or more remote content airing stations with scheduling instructions specifying broadcast parameters of the advertising content;

wherein the advertising content embodies one or more dynamic content fields to be resolved prior to broadcast of the advertising content from any of the one or more remote content airing stations;

wherein the receive interface is to further receive an indication at the system from one of the remote content airing stations that the advertising content is to be broadcast;

an air check analyzer to capture a broadcast of the advertising content for analysis at the system; and wherein the air check analyzer further is to validate the broadcast of the advertising content.

20. The system of claim 19:

wherein the network transmitter is to further: display the advertising content in a script format to a GUI of a user computing device at the content airing station to broadcast the advertising content, display a first clickable button at the GUI of the user computing device to mark the advertising content as having been read live on-air as part of the broadcast, and display a second clickable button at the GUI of the user computing device to trigger playback of sonic branding audio through a soundboard of the content airing station to broadcast the advertising content; and wherein the receive interface is to further: receive a first click event of the first clickable button indicating the advertising content has been marked as read live on-air as part of the broadcast and recording a time of broadcast of the advertising content for audit and validation of the broadcast, and receive a second click event of the second clickable button indicating the playback of the sonic branding audio has been initiated, wherein the second click event triggers an IP burst of the sonic branding audio to the soundboard of the content airing station which broadcasts the sonic branding audio live on-air as part of the broadcast of the advertising content.

\* \* \* \* \*